(12) United States Patent
S.

(10) Patent No.: US 11,210,885 B2
(45) Date of Patent: Dec. 28, 2021

(54) DIGITALIZED HIGH VALUE PAPER CURRENCY

(71) Applicant: Dhanya R. S., Trichur (IN)

(72) Inventor: Dhanya R. S., Trichur (IN)

( * ) Notice: Subject to any disclaimer, the term of this patent is extended or adjusted under 35 U.S.C. 154(b) by 0 days.

(21) Appl. No.: 16/643,432

(22) PCT Filed: Aug. 29, 2018

(86) PCT No.: PCT/IB2018/056579
§ 371 (c)(1),
(2) Date: Feb. 28, 2020

(87) PCT Pub. No.: WO2019/043590
PCT Pub. Date: Mar. 7, 2019

(65) Prior Publication Data
US 2020/0364963 A1 Nov. 19, 2020

(30) Foreign Application Priority Data

Aug. 30, 2017 (IN) .............................. 201741030652
Jun. 13, 2018 (IN) .............................. 201741030652

(51) Int. Cl.
*G07D 7/0043* (2016.01)
*G06Q 20/20* (2012.01)
*G06Q 20/40* (2012.01)

(52) U.S. Cl.
CPC ......... *G07D 7/0043* (2017.05); *G06Q 20/204* (2013.01); *G06Q 20/4016* (2013.01)

(58) Field of Classification Search
CPC . G07D 7/0043; G06Q 20/204; G06Q 20/4016

USPC ......................................................... 235/379
See application file for complete search history.

(56) References Cited

U.S. PATENT DOCUMENTS

| | | | | |
|---|---|---|---|---|
| 7,120,606 | B1* | 10/2006 | Ranzini | G06Q 20/02 705/64 |
| 2018/0158036 | A1* | 6/2018 | Zhou | H04L 67/104 |
| 2018/0211718 | A1* | 7/2018 | Heath | A01K 29/005 |
| 2018/0268382 | A1* | 9/2018 | Wasserman | G06Q 20/0655 |

\* cited by examiner

*Primary Examiner* — Michael G Lee
*Assistant Examiner* — David Tardif

(57) ABSTRACT

Disclosed herein is a novel invention of Digitalized High Value Paper Currency (DHVPC) and its overall processes for the printing, registration, distribution, recording and monitoring of transactions through a specially designed Online Portal. During the DHVPC registration, opening of additional ledger window with simultaneous automatic generation of a window in the Online Portal of Reserve Bank/Central bank of each nation takes place with automatic updating of transactions of DHVPC. This Invention provides 100% protection from counterfeiting of Paper Currency, monitoring, tracking of currency, blocking of illegal transactions, value protection in unforeseen situations, easiness to carry and handle, faster scanning of currency and improved security. The DHVPC transactions can be done through Commercial and Scheduled Banks or ATM/CDM or Net Banking. Counterfeiting is 100% impossible because, the registration of DHVPC is possible only through Reserve bank/Central bank of each nation, parallel entry of currency into the circulation is not possible.

30 Claims, 29 Drawing Sheets

PATTERN OF DIGITALIZED HIGH VALUE PAPER CURRENCY (DHVPC)

FOR INDIAN DHVPC - SPECIMEN

Figure 1:
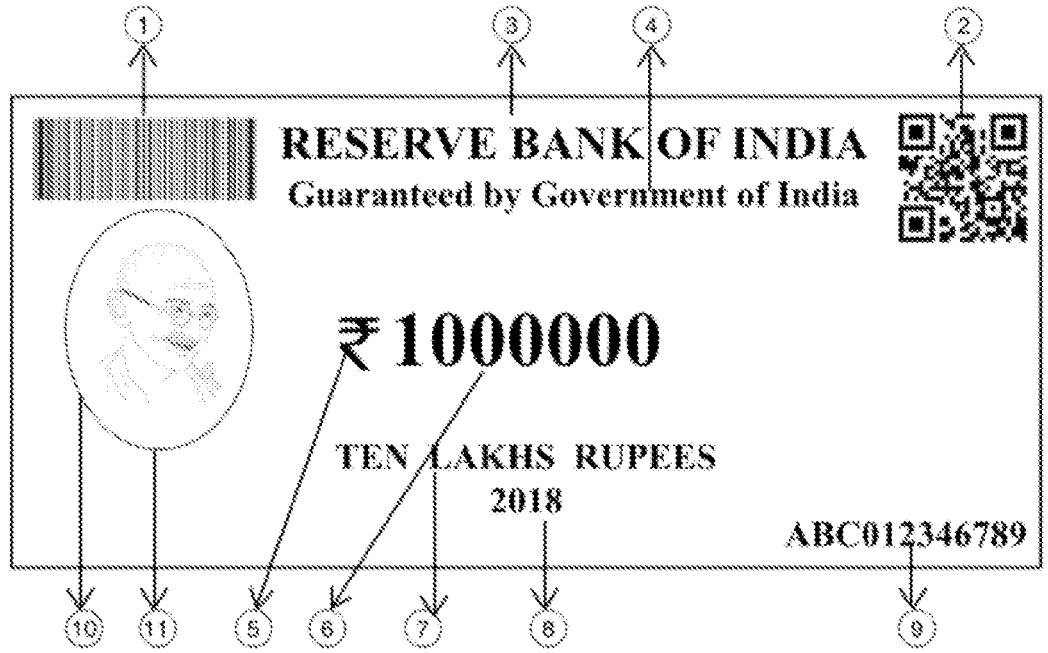
Figure 2:
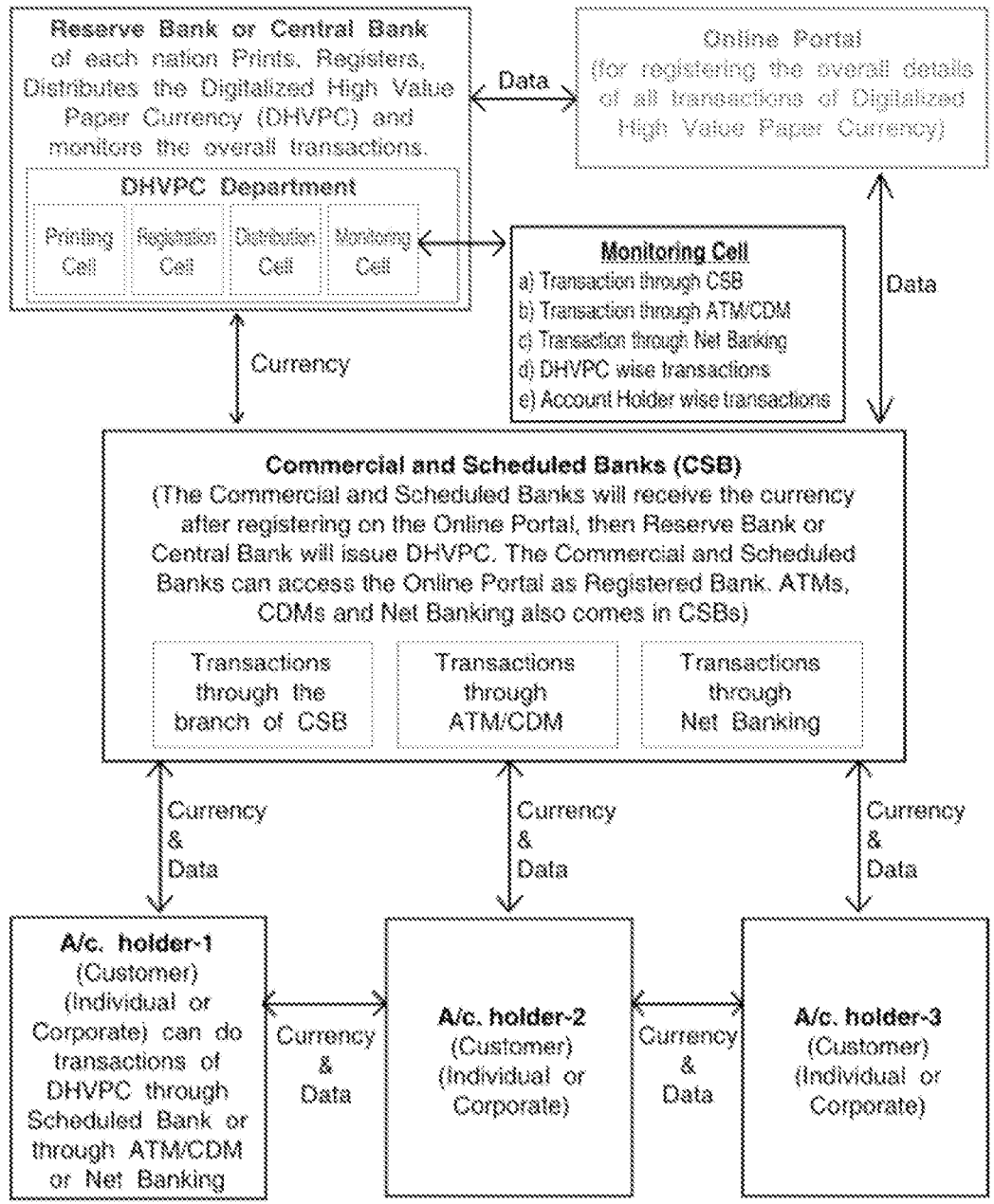
Figure 3:
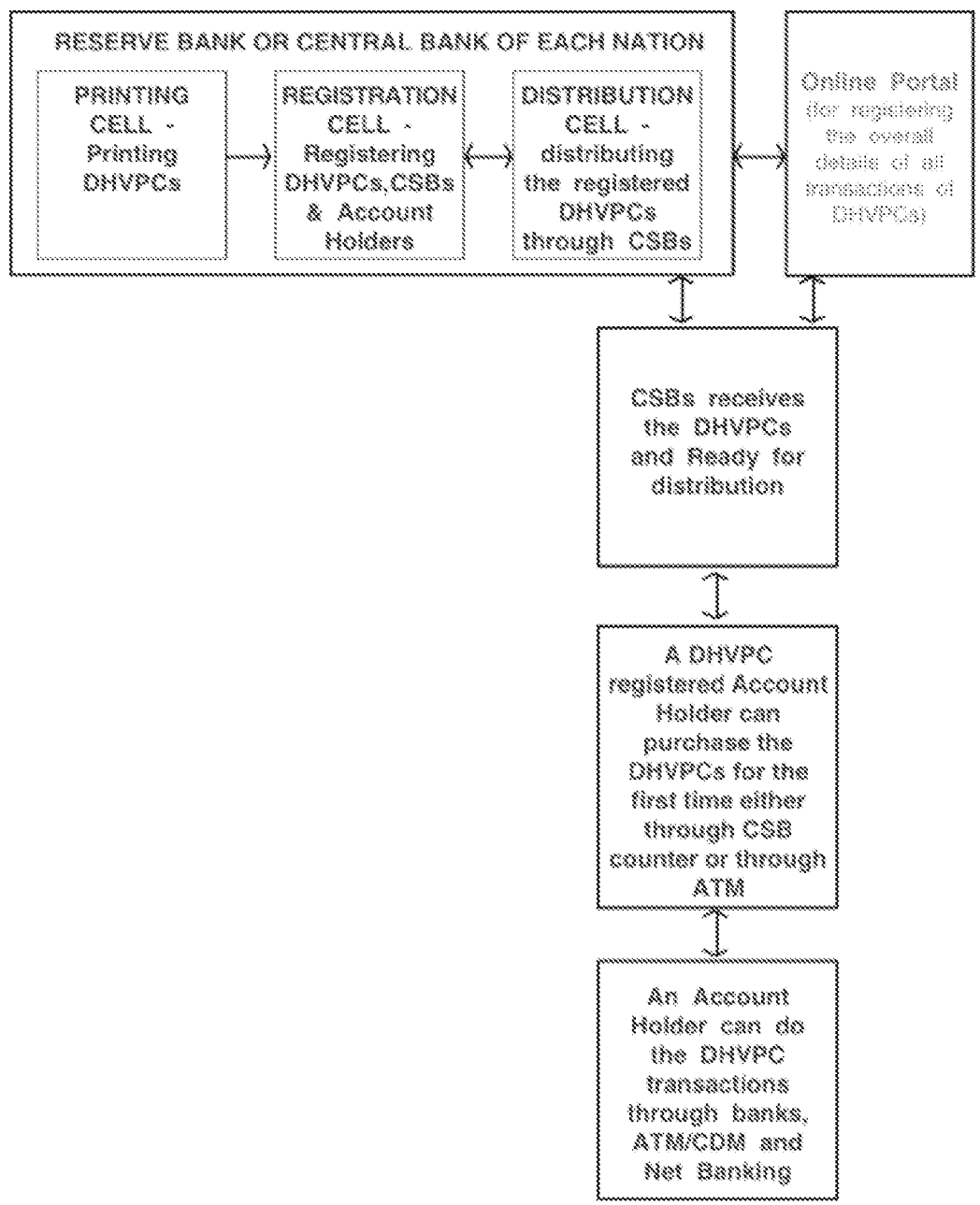
Figure 4:
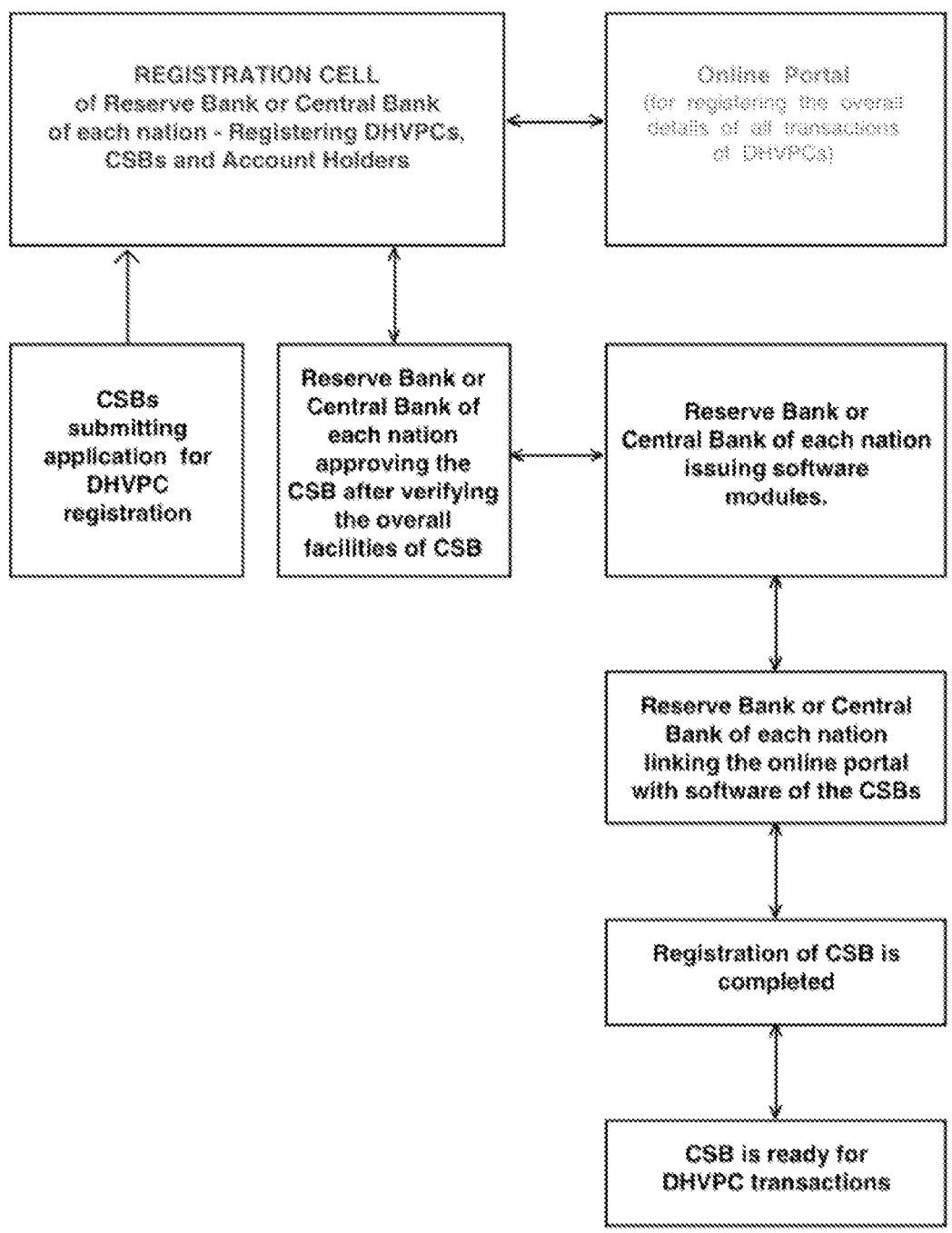
Figure 5:
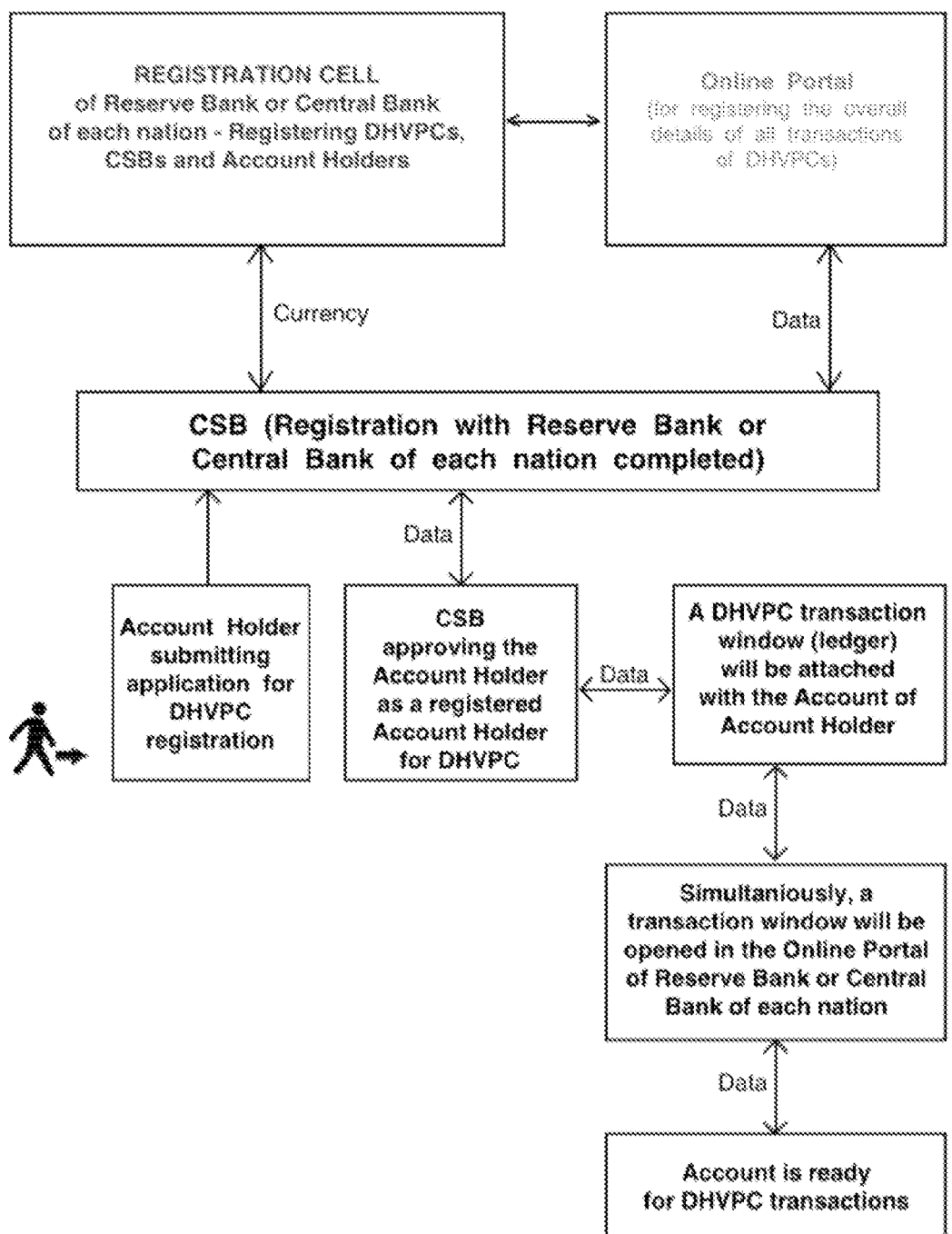
Figure 9:
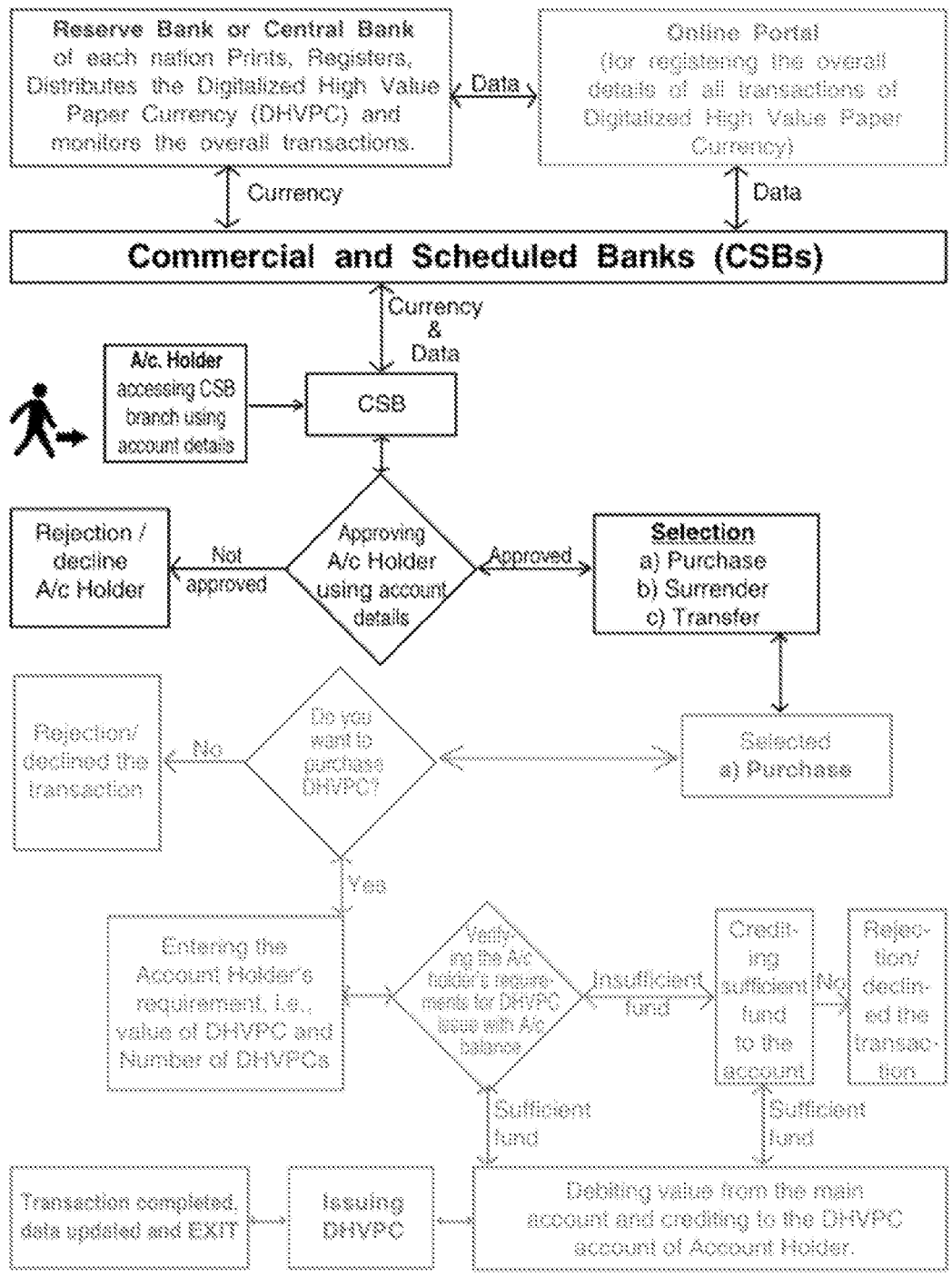
Figure 10:
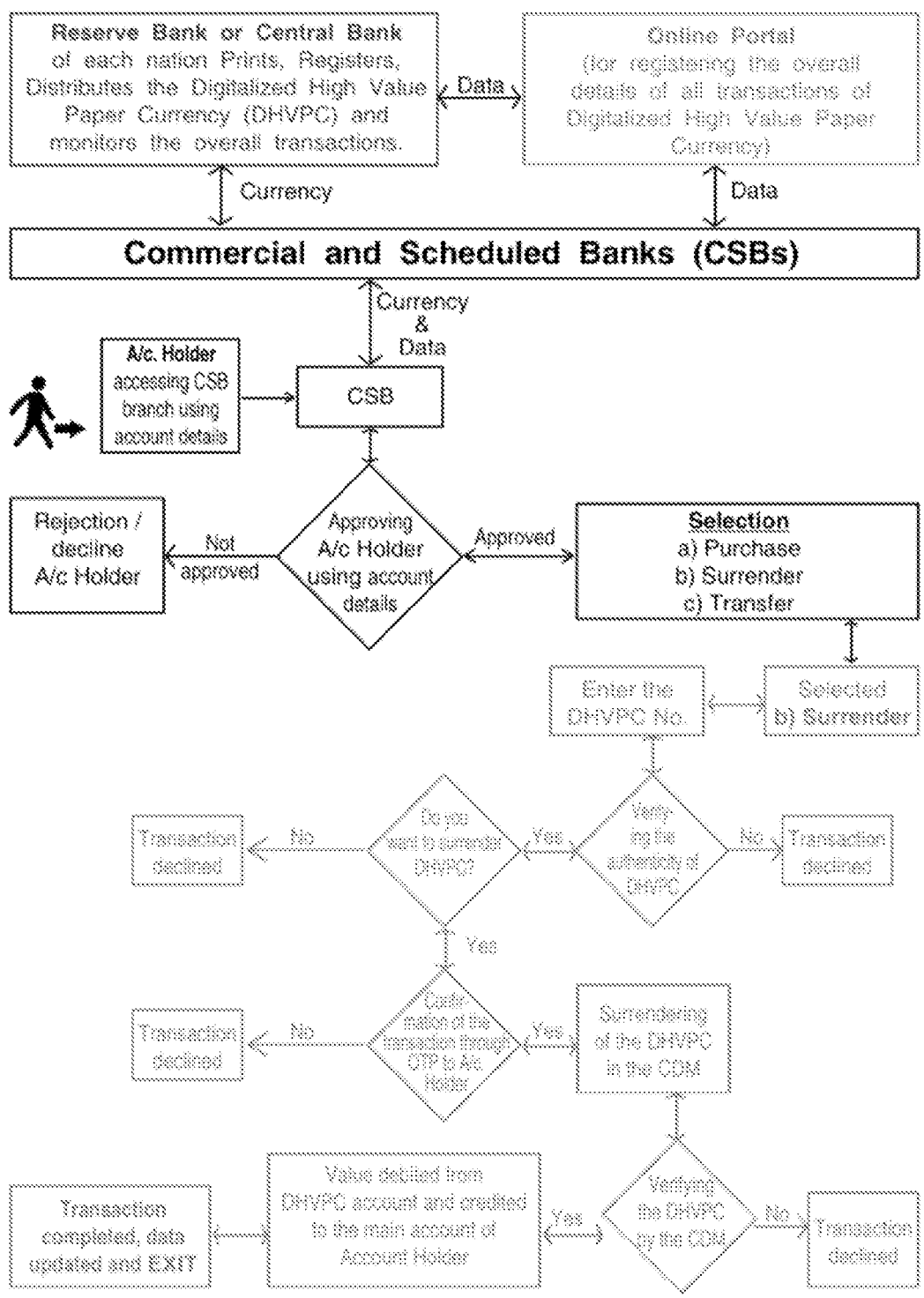
Figure 11:
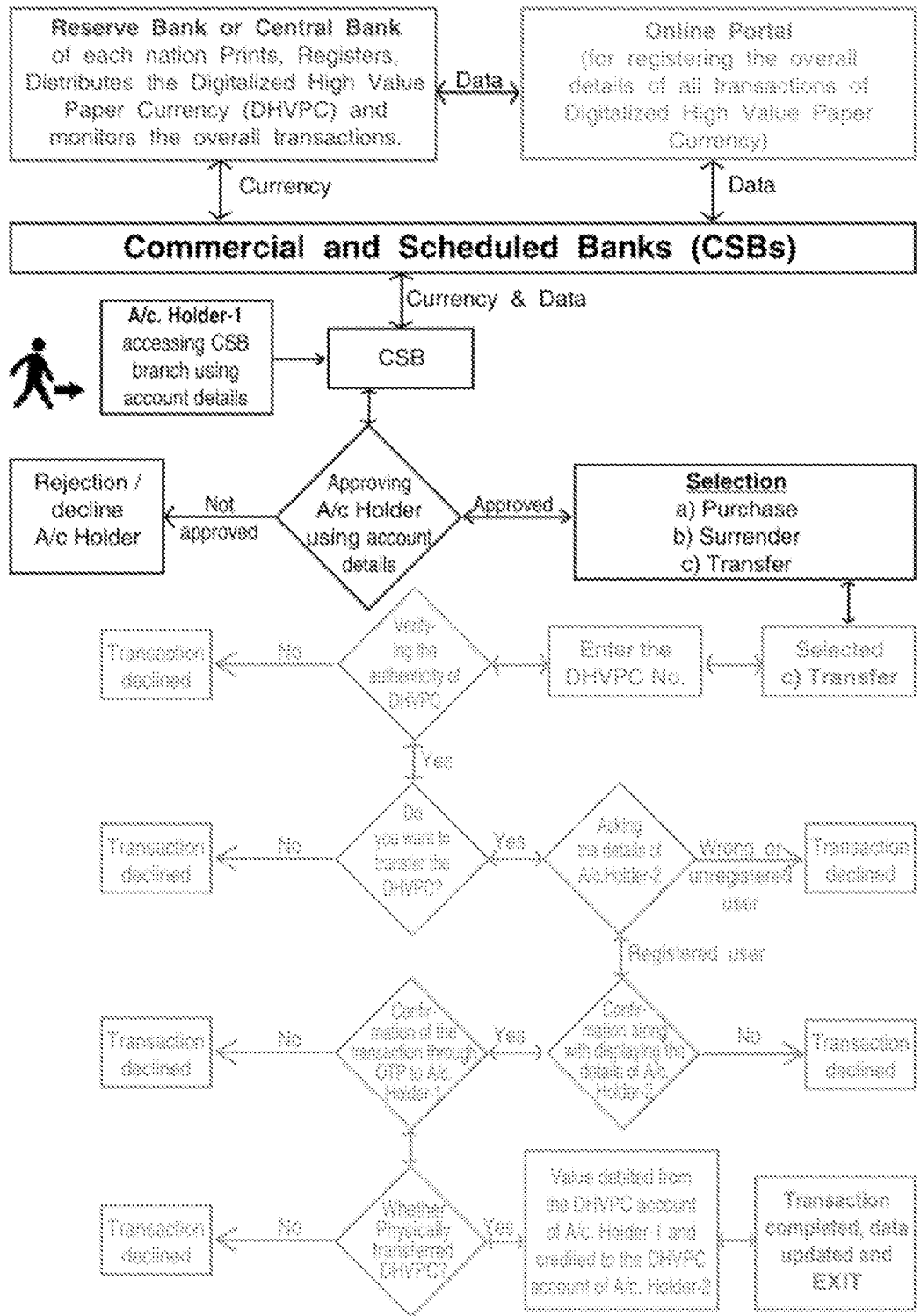
Figure 12:
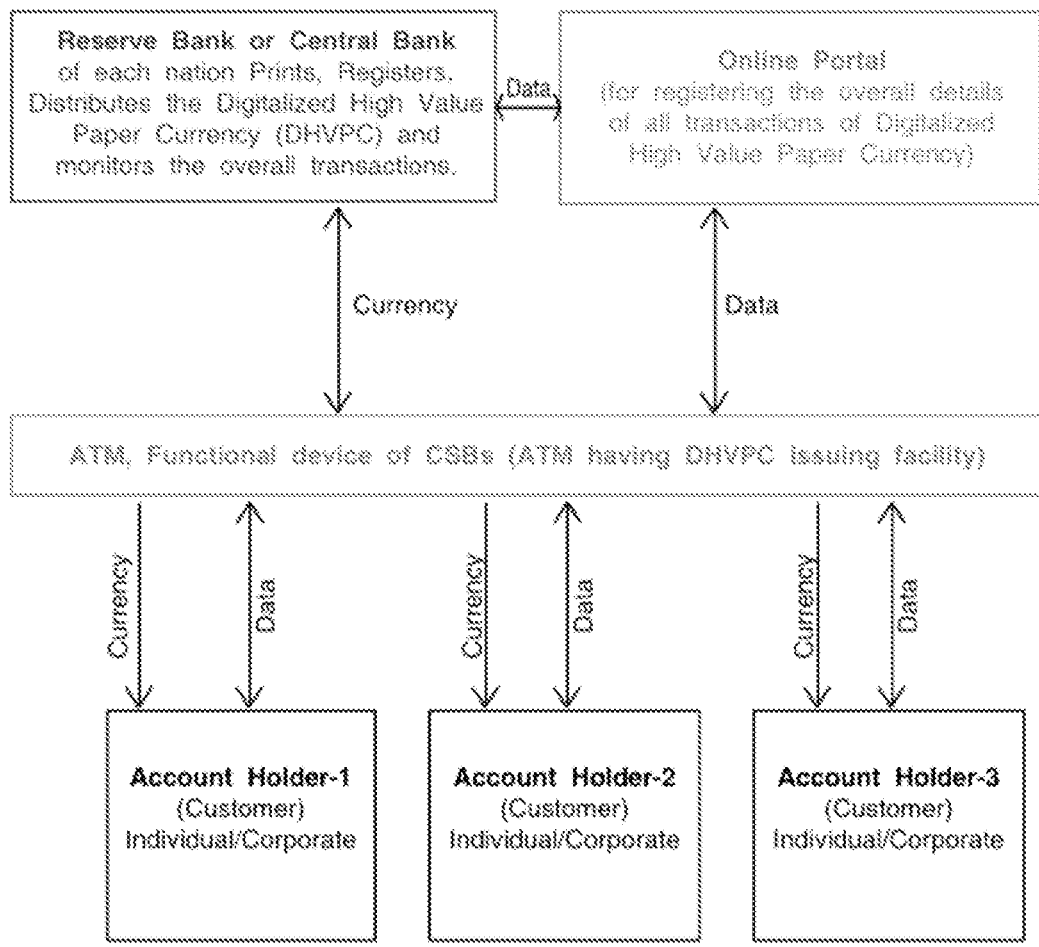
Figure 13:
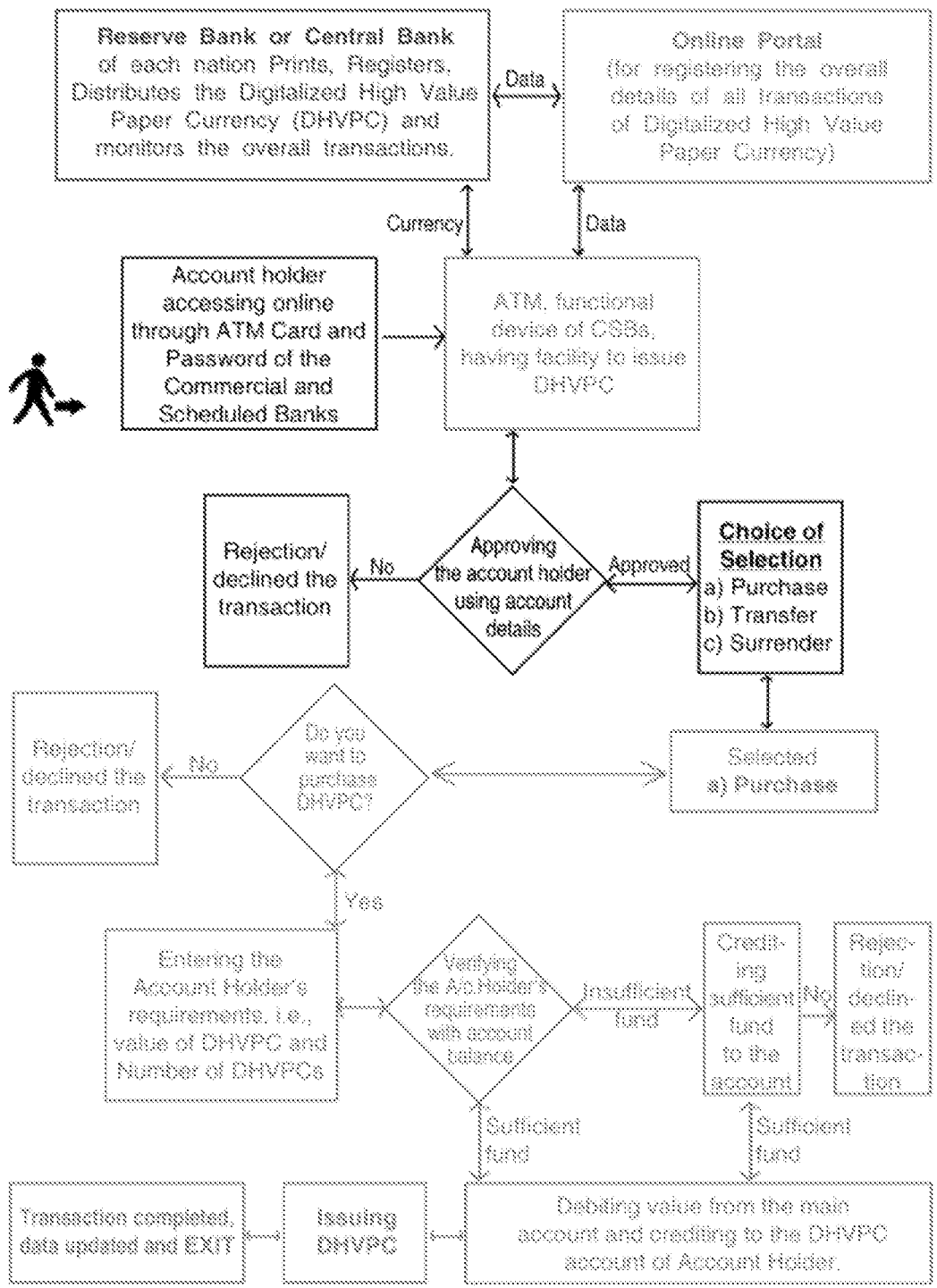
Figure 14:
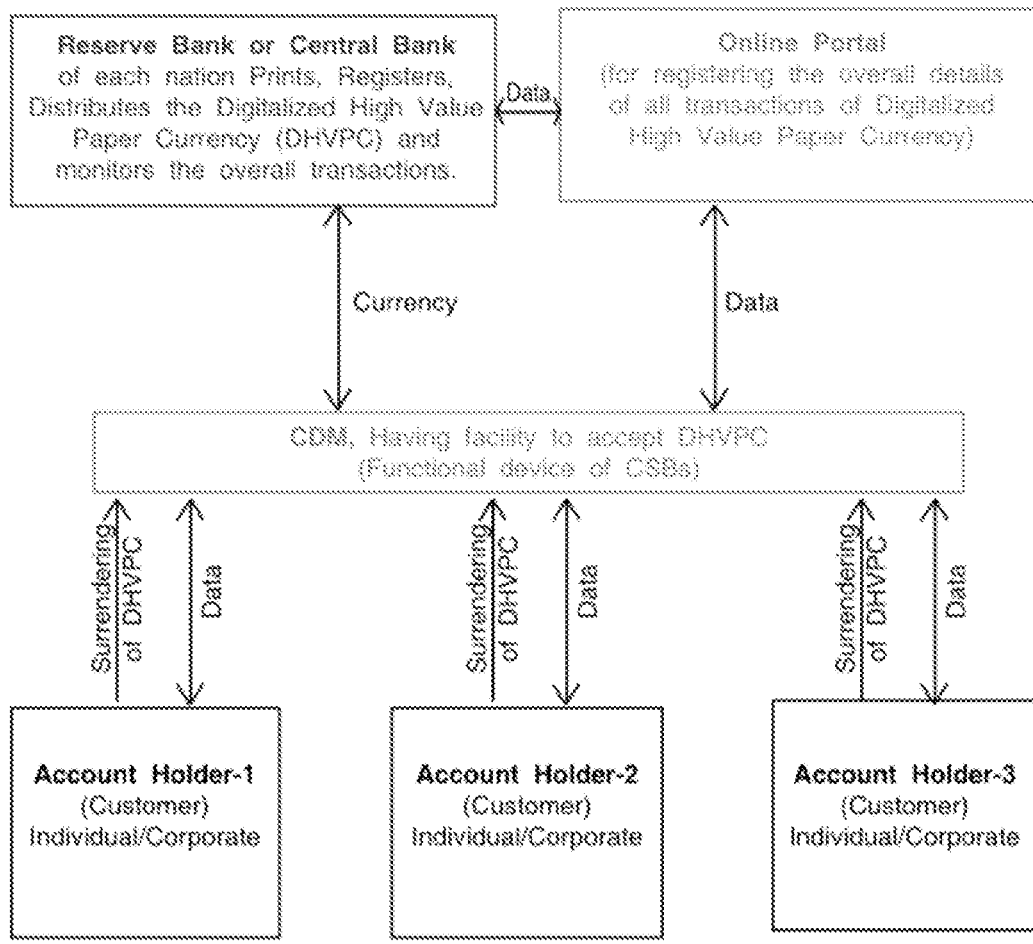
Figure 15:
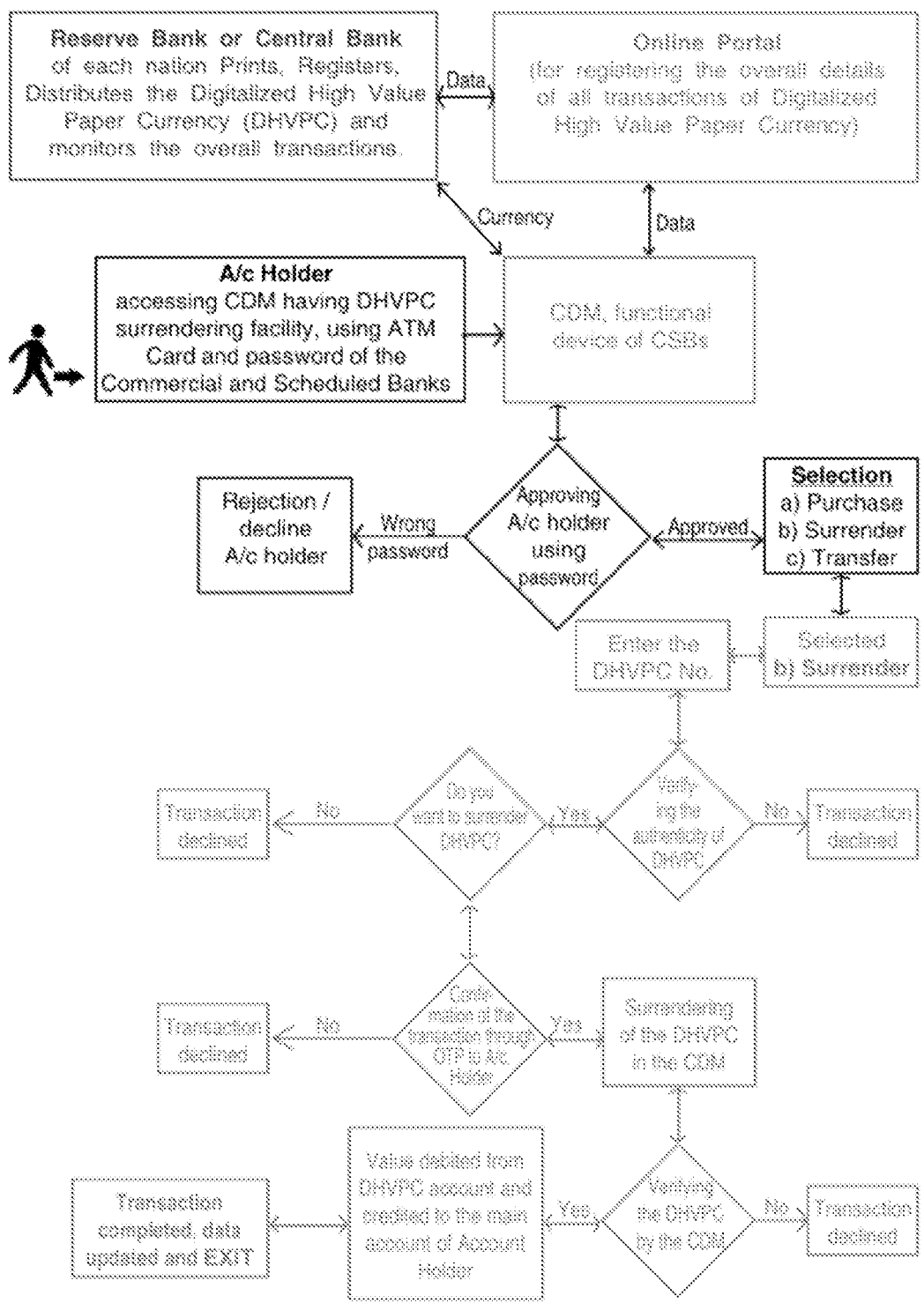
Figure 17:
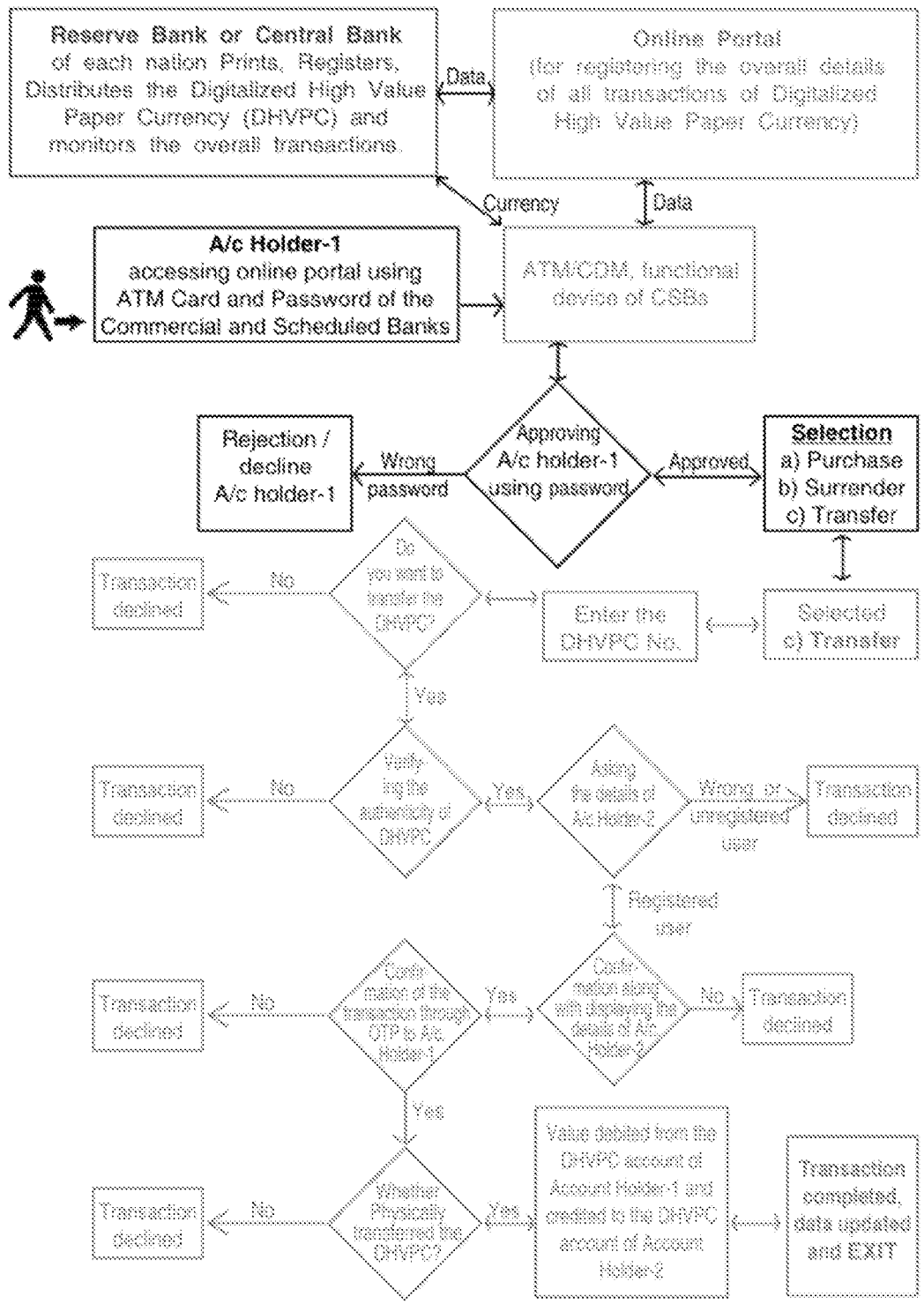
Figure 18:
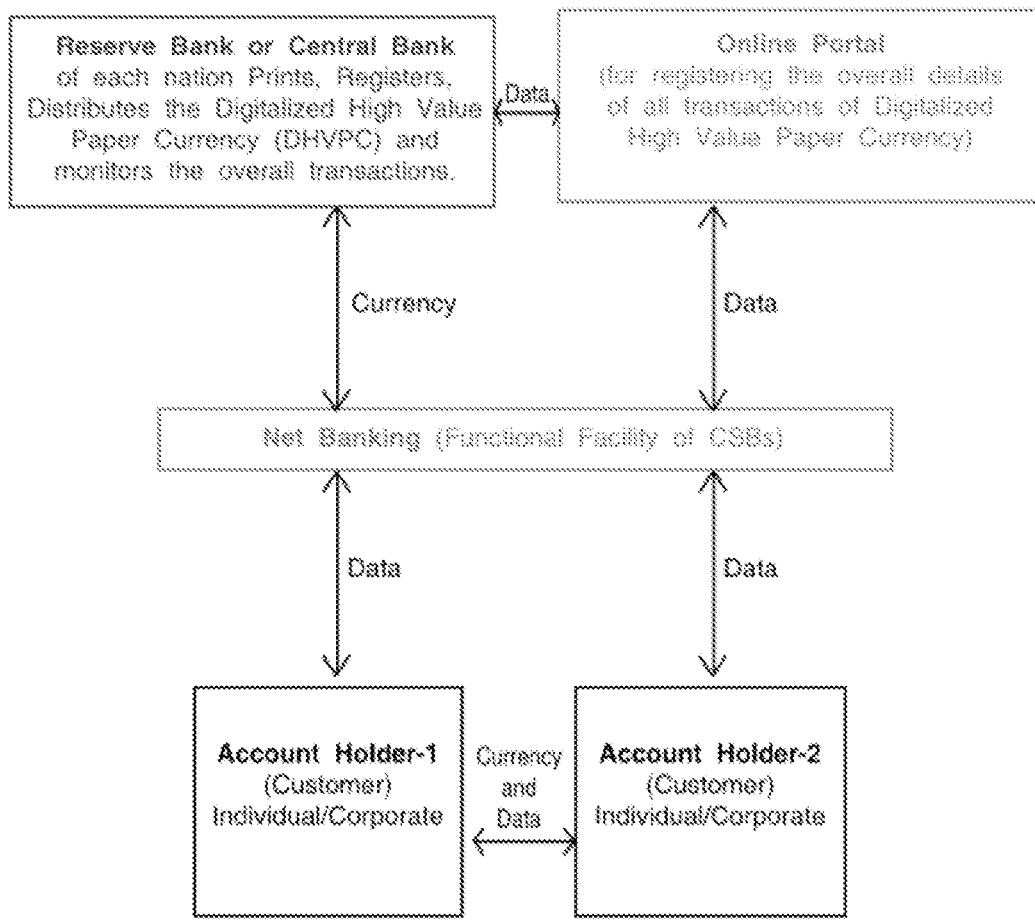
Figure 19:
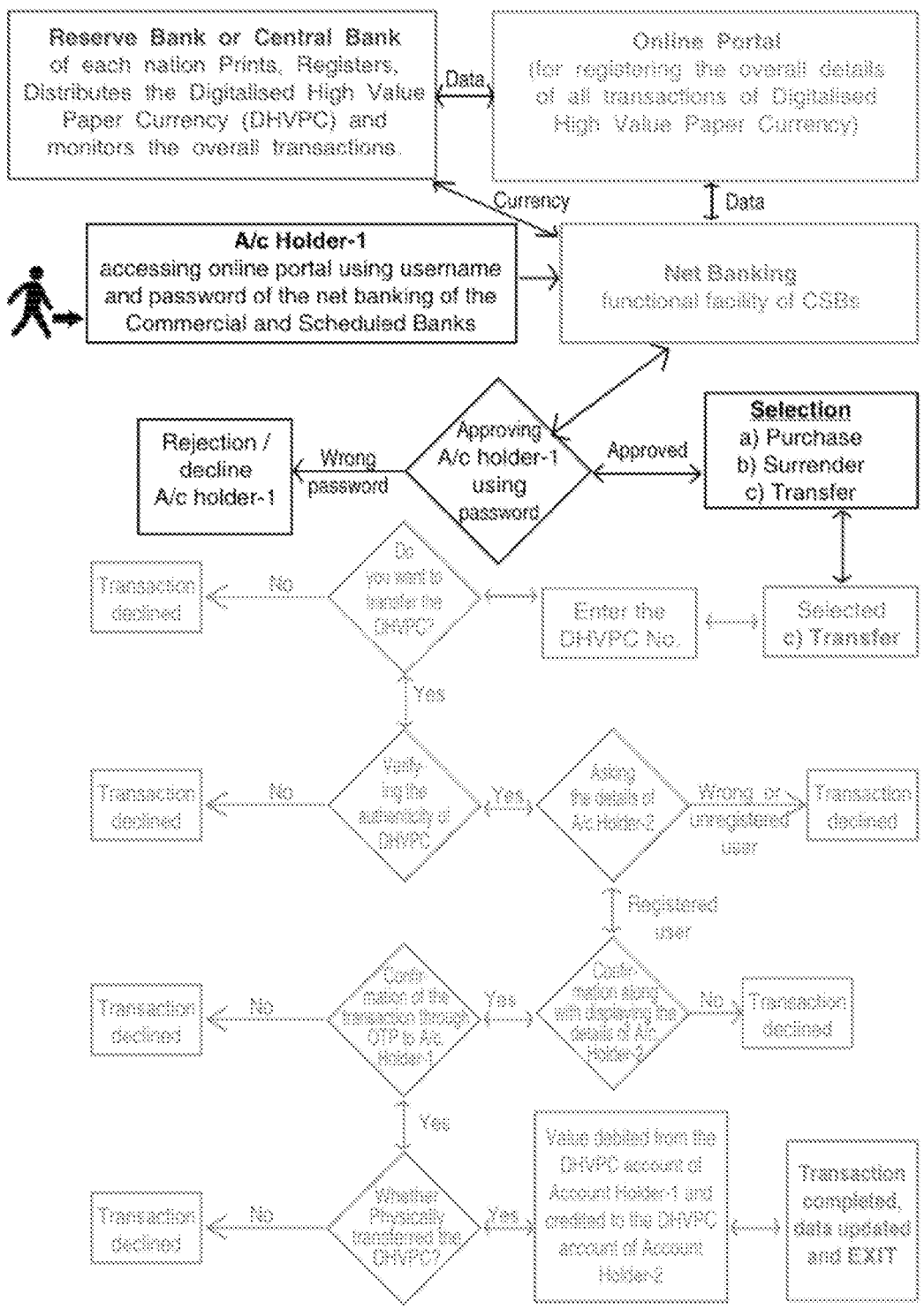
Figure 20:
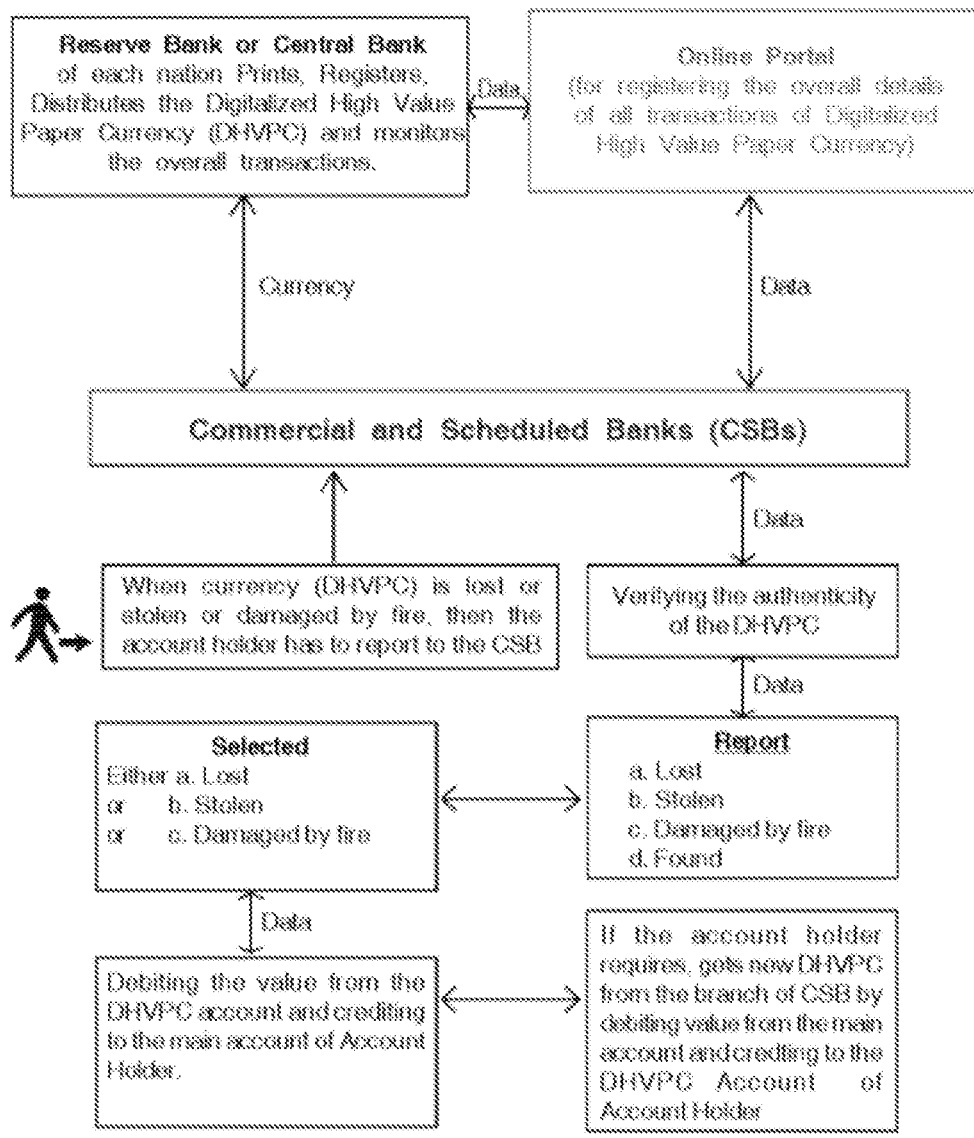
Figure 21:
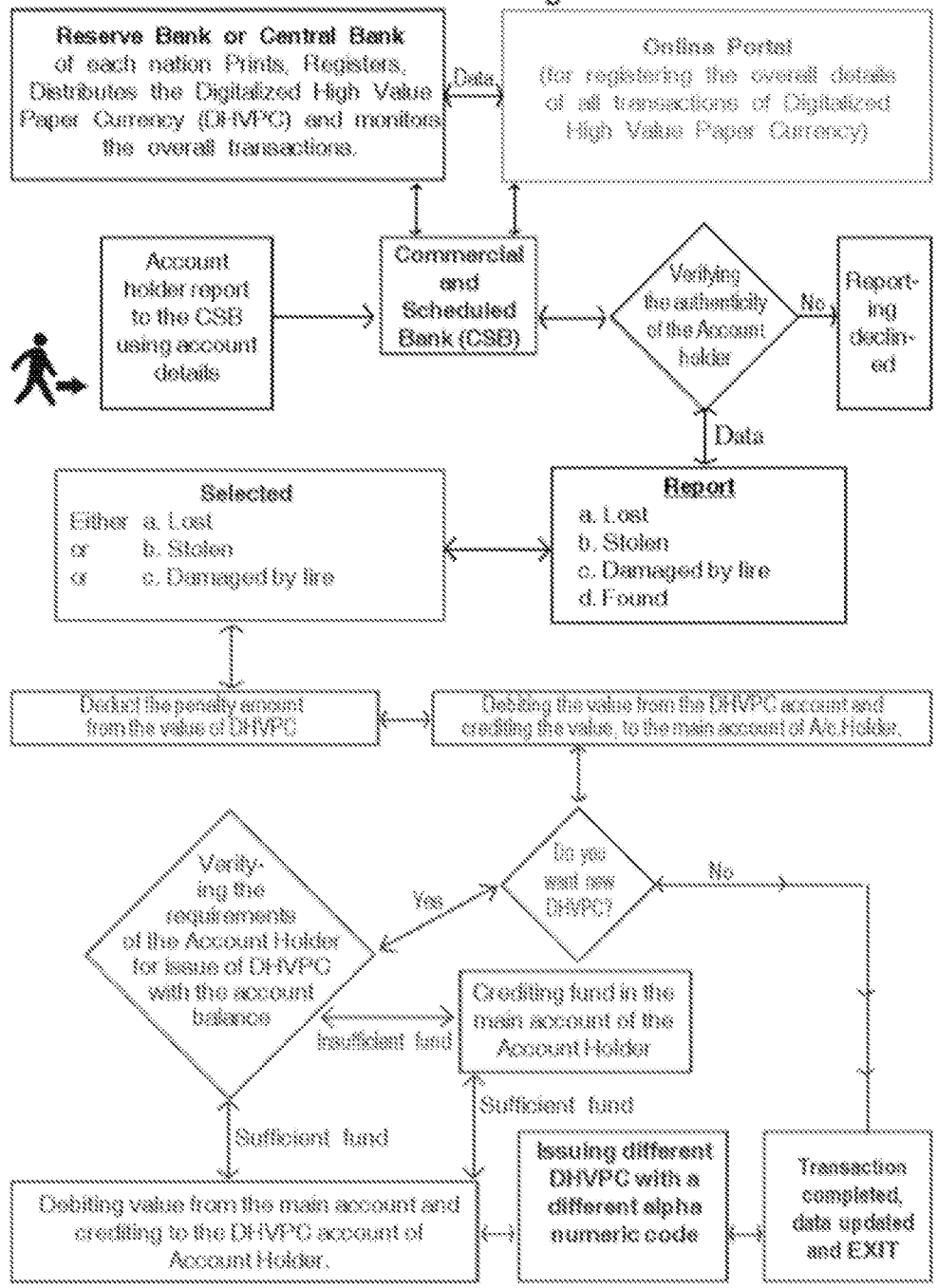
Figure 24:
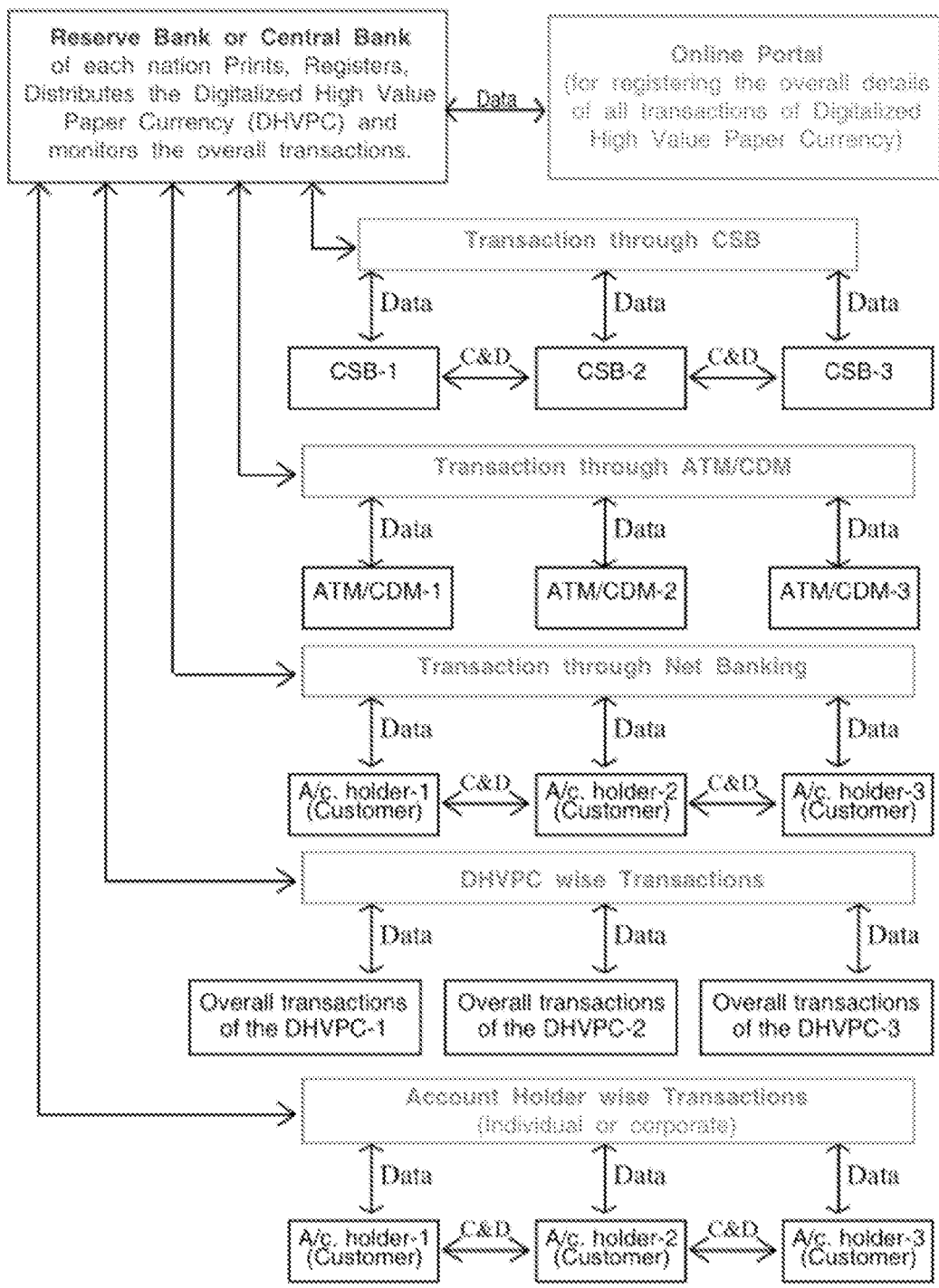
Figure 25:
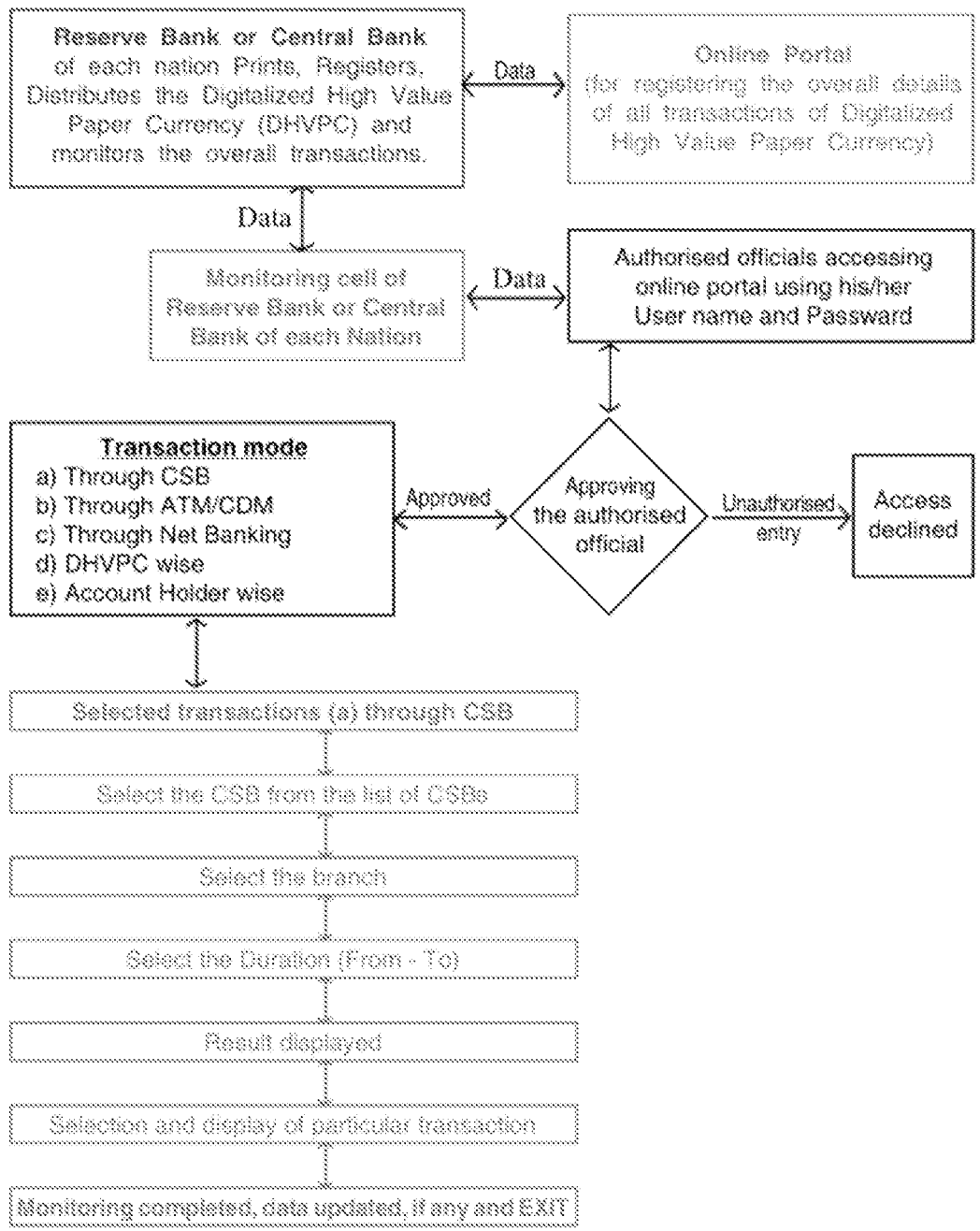
Figure 26:
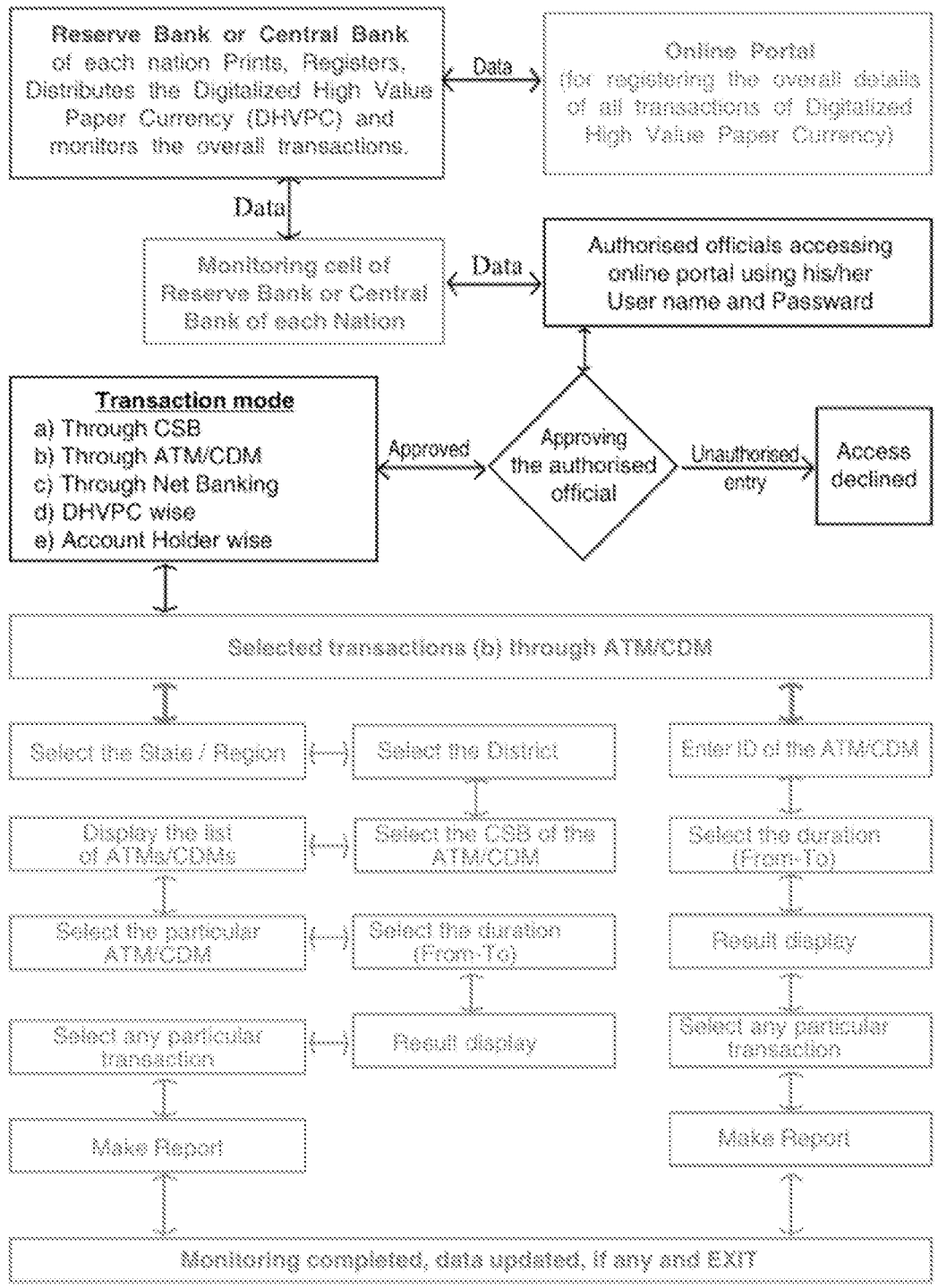
Figure 27:
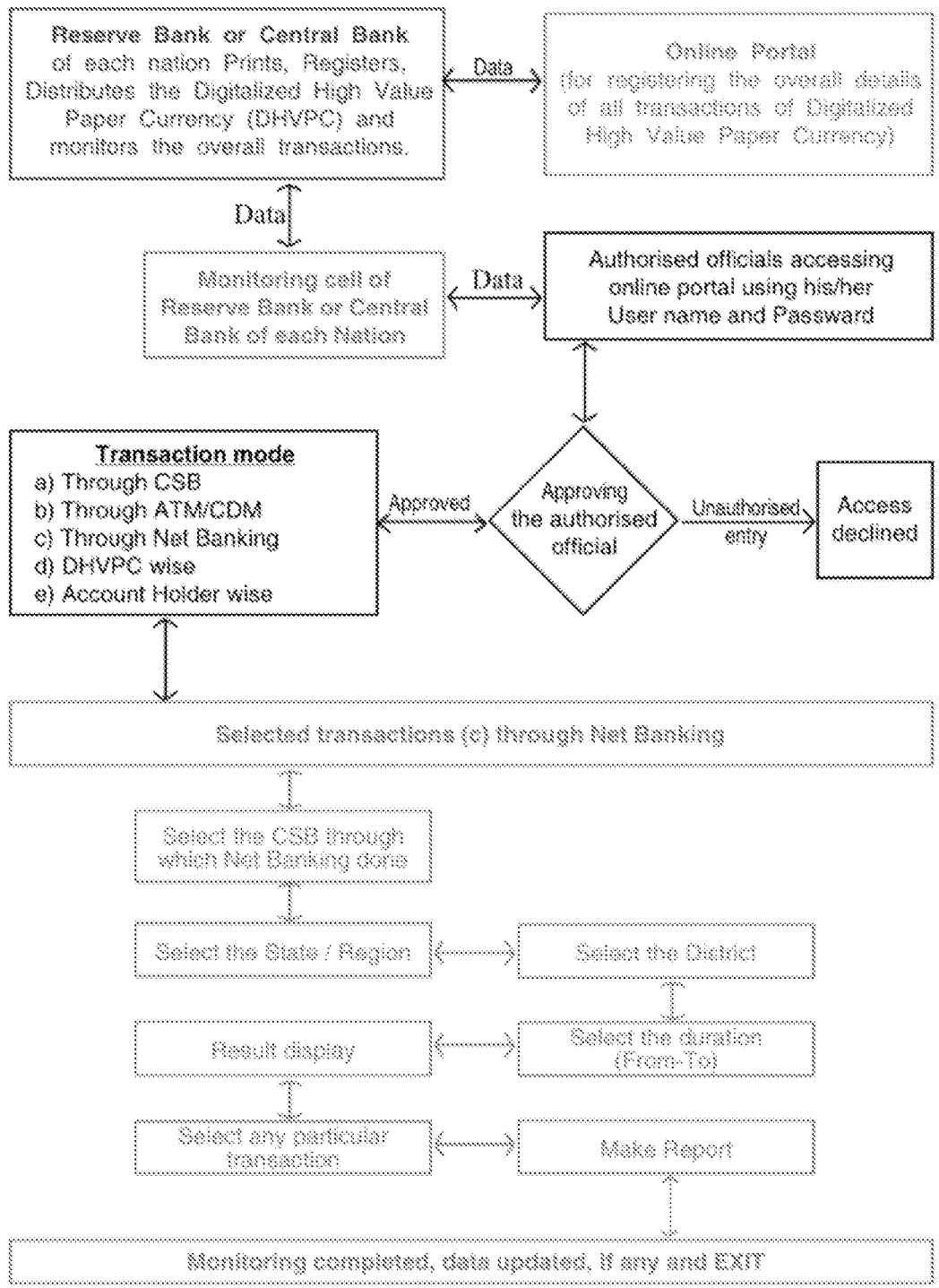
Figure 28:
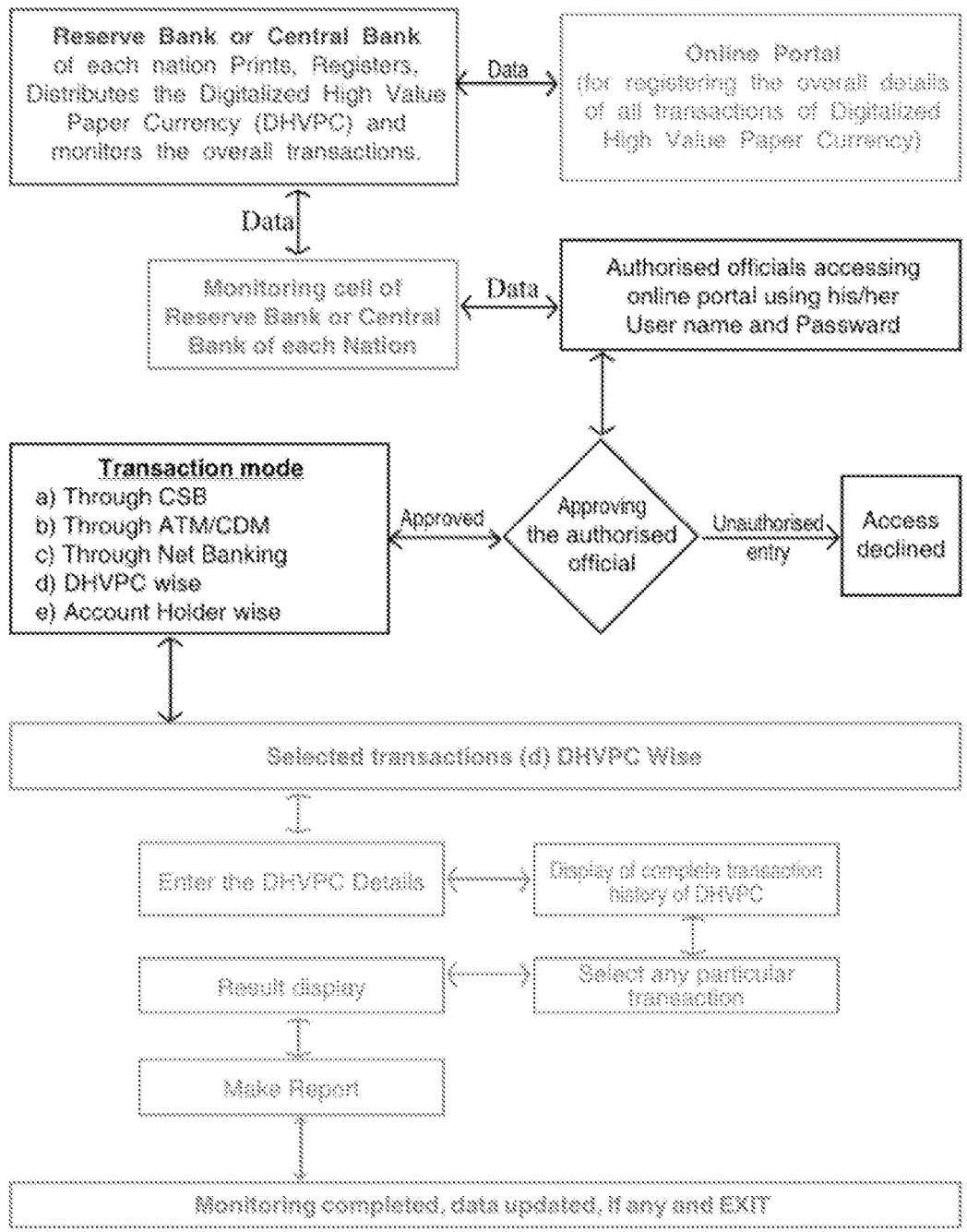
Figure 29:
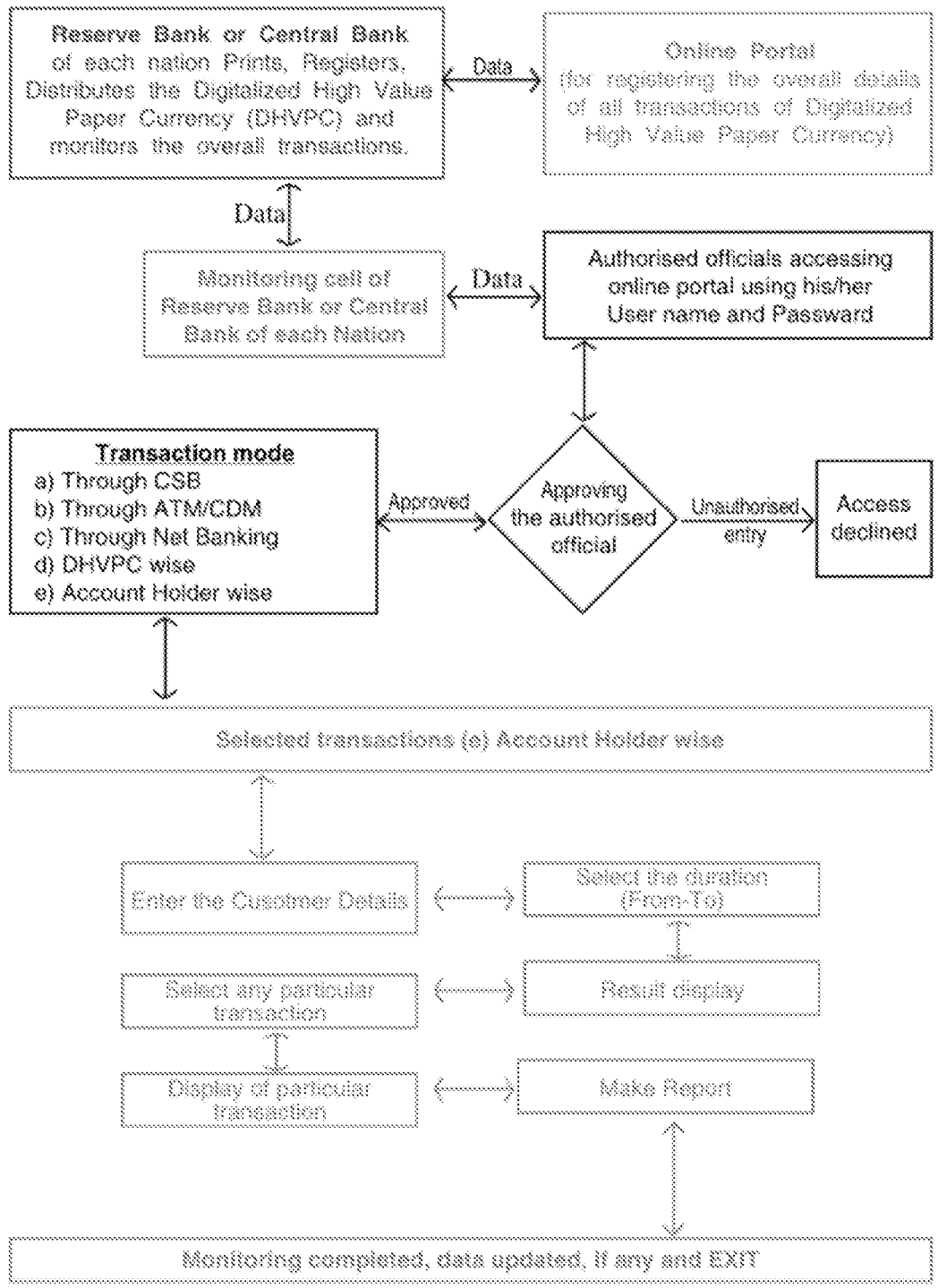

NOTE:
1. Bar Code
2. QR Code
3. Name of Central Bank
4. Name of Government providing guarantee
5. Currency symbol
6. Value of currency in figures
7. Value of currency in words
8. Year of printing
9. Alpha-Numeric code of currency
10. White area
11. Water-mark

PATTERN OF DIGITALIZED HIGH VALUE PAPER CURRENCY (DHVPC)

FOR INDIAN DHVPC - SPECIMEN

NOTE:
1. Bar Code
2. QR Code
3. Name of Central Bank
4. Name of Government providing guarantee
5. Currency symbol
6. Value of currency in figures
7. Value of currency in words
8. Year of printing
9. Alpha-Numeric code of currency
10. White area
11. Water-mark Note: 1) 'Data' here means updating the transaction data.
2) 'Currency' here means physical currency (DHVPC).
3) Transactions means, purchase, surrendering and transfer of DHVPCs.

REGISTRATION OF CSBs WITH ONLINE PORTAL OF RESERVE BANK OR CENTRAL BANK OF EACH NATION
- Schematic Diagram

LEDGER PAGES OF CONVENTIONAL AND DHVPC ACCOUNTS - Pattern

1. CONVENTIONAL LEDGER FOR ACCOUNT

| Sl. No. | Date | Particulars | Credit | Debit | Balance | Digital sign |
|---|---|---|---|---|---|---|
| | | | | | | |

2. LEDGER OF DHVPC ACCOUNT HOLDER-1

| MAIN WINDOW | | | | | | | DHVPC WINDOW | | | | | | |
|---|---|---|---|---|---|---|---|---|---|---|---|---|---|
| Sl. No. | Date | Particulars | Credit | Debit | Balance | Digital sign | Sl. No. | Date | Particulars | Credit | Debit | Balance | Digital sign |
| | | | | | | | | | | | | | |

3. LEDGER OF DHVPC ACCOUNT HOLDER-2

| MAIN WINDOW | | | | | | | DHVPC WINDOW | | | | | | |
|---|---|---|---|---|---|---|---|---|---|---|---|---|---|
| Sl. No. | Date | Particulars | Credit | Debit | Balance | Digital sign | Sl. No. | Date | Particulars | Credit | Debit | Balance | Digital sign |
| | | | | | | | | | | | | | |

FIG. 6

Note: 1) Issue of DHVPC (Here, value debited from main window and credited to the DHVPC window of Account Holder)
2) Surrendering of DHVPC (Here, value debited from the DHVPC window and credited to the main window of Account Holder-1&2)
3) Transfer of DHVPC (Here, value debited from DHVPC window of Account Holder-1 and credited to the DHVPC window of Account Holder-2)

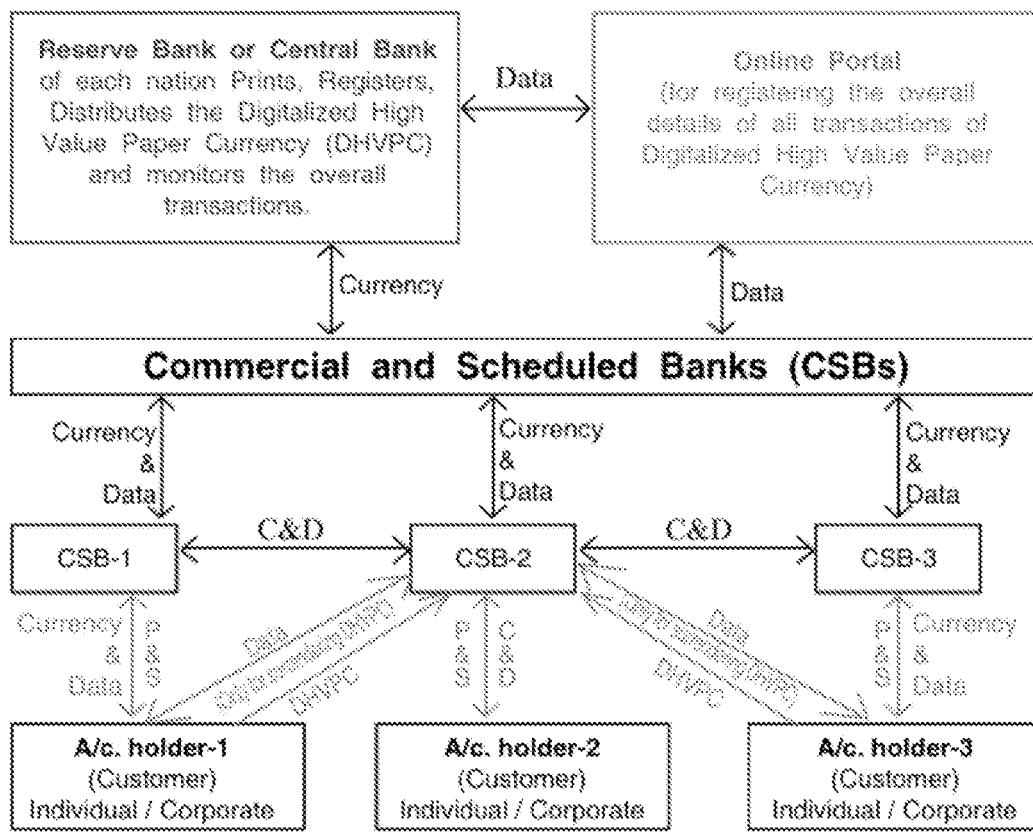

FIG. 7

Note:
1. C&D - Currency and updating of the Data in each and every transaction.
2. P&S - Purchase and surrendering of DHVPC.
3. CSB-1,2 & 3, which are branches of same bank or different bank, can do transactions among themselves.
4. CSB-1 is the home branch of Account Holder-1, CSB-2 is the home branch of Account Holder-2 and CSB-3 is the home branch of the Account Holder-3.
5. An Account Holder can do DHVPC transactions with his home branch, or with other branches of same bank or different banks.
6. An Account Holder can receive DHVPC from another Account Holder through the branch of any one of them.
7. Here, Account Holder-1 can purchase and surrender the DHVPC through their home branch.
8. Here, Account Holders 1, 2 & 3 can purchase the DHVPC from their Home Bank with simultaneous debiting of value from the main account and crediting to the DHVPC account of Account Holders.
9. Here, Account Holder-1 can only surrender the DHVPC to CSB-2 with simultaneous crediting of value to the main account of Account Holder-1, likewise surrending of DHVPC by Account Holder-3 to CSB-2. (In general, any Account Holder can surrender the DHVPC at any CSB, but can purchase the DHVPC from only home bank)

TRANSACTION THROUGH BANKS - TRANSFER OF DHVPC - Schematic Diagram

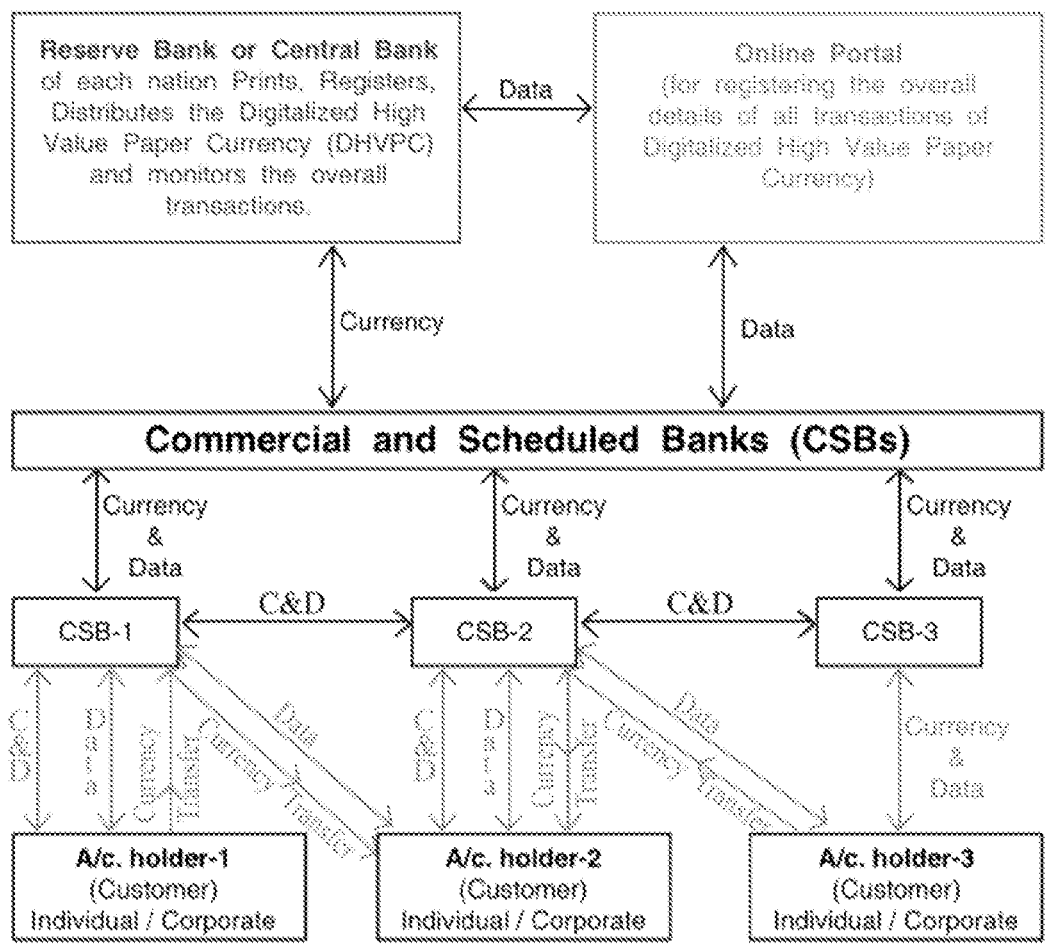

FIG. 8

Note:
1. C&D - Currency and updating of the Data in each and every transaction.
2. CSB-1,2&3, which are branches of same bank or different bank, can do transactions among themselves.
3. CSB-1 is the home branch of Account Holder-1, CSB-2 is the home branch of Account Holder-2 and CSB-3 is the home branch of the Account Holder-3
4. An Account Holder can do DHVPC transactions with his home branch, or with other branches of same bank or different banks.
5. An Account Holder can receive DHVPC from another Account Holder through the branch of any one of the CSB.
6. Account Holder-1 can transfer the DHVPC to Account Holder-2, through CSB-1 (after CSB officials accessing online portal) and can handover the DHVPC manually/physically from Account Holder-1 to Account Holder-2. At the same time, value will be debited from the DHVPC account of Account Holder-1 and credited to the DHVPC account of Account Holder-2. Likewise between Account Holder-3 and 2.

TRANSACTION THROUGH BANKS - SURRENDER OF DHVPC - Process Diagram

TRANSACTION THROUGH ATMs - ISSUE OF DHVPC
- Schematic Diagram

Note: Here, Account Holder-1, 2 & 3 utilize ATMs for the issue of DHVPCs with simultaneous data updating. (Value will be debited from the main account of Account Holders and credited to the DHVPC account of Account Holders.)

TRANSACTION THROUGH CDMs - SURRENDERING
OF DHVPC - Schematic Diagram

Note:
1) Here, Account Holder-1, 2 & 3 surrenders the DHVPC to CDM with simultaneous data updating.
2) Value will be debited from the DHVPC account of Account Holders 1, 2 & 3 and credited to the main account of Account Holder-1, 2 and 3 during surrendering.

TRANSACTION THROUGH ATM/CDM - TRANSFER OF DHVPC WHEN 2 ACCOUNT HOLDERS ARE TOGETHER - Schematic Diagram

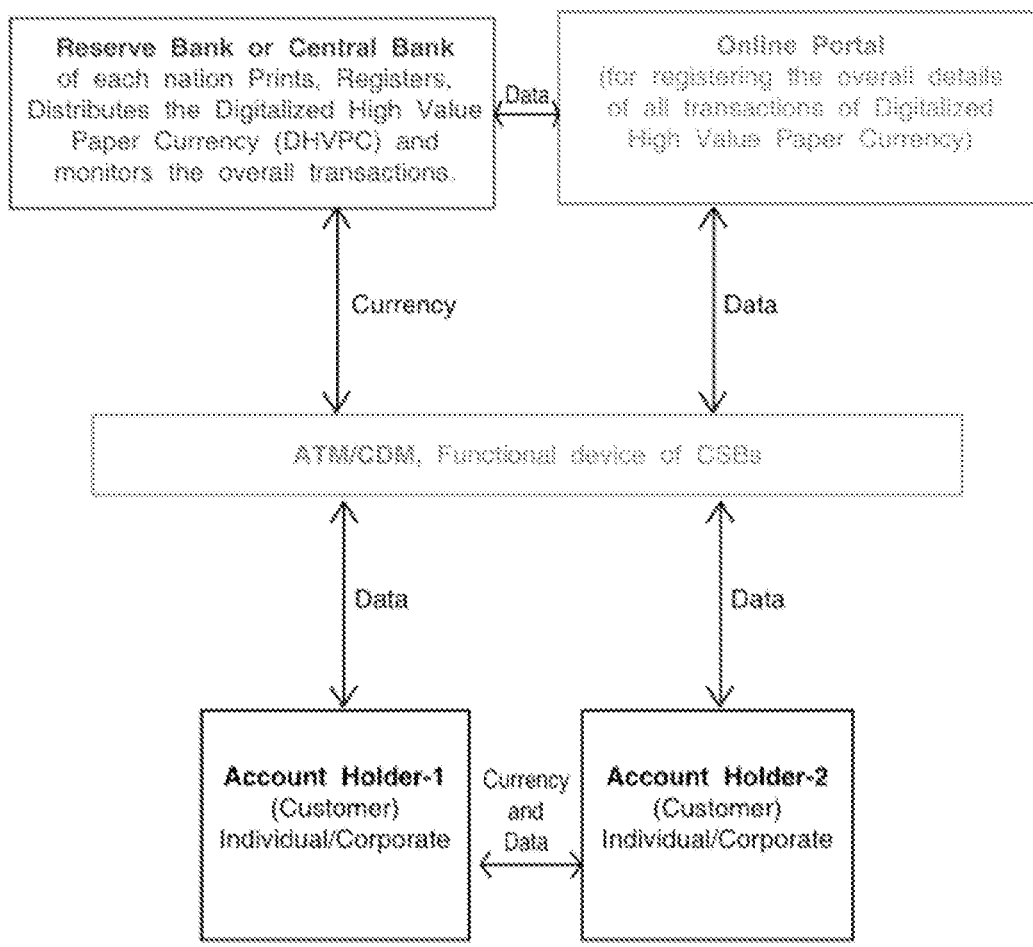

FIG. 16

Note:
1) Here, Account Holder-1 accessing online portal through ATM or CDM, transfer the value to the account of Account Holder-2 with simultaneous handover of physical currency and similarly from Account Holder-2 to Account Holder-1.
2) Here, value debited from the DHVPC account of Account Holder-1 and credited to the DHVPC account of Account Holder-2.

Note: 1) Here, Account Holder-1 by accessing Online Portal through Net Banking, handover DHVPC to Account holder-2 and simultaniously data updating will take place and vice-versa from Account Holder-2 to Account Holder-1.
2) Here, Value debited from the DHVPC account of Account Holder-1 and credited to the DHVPC account of Account Holder-2.

TRANSACTION THROUGH NET BANKING - TRANSFER OF DHVPC - Process Diagram

WHEN THIRD PARTY GETS THE LOST DHVPC
- Schematic Diagram

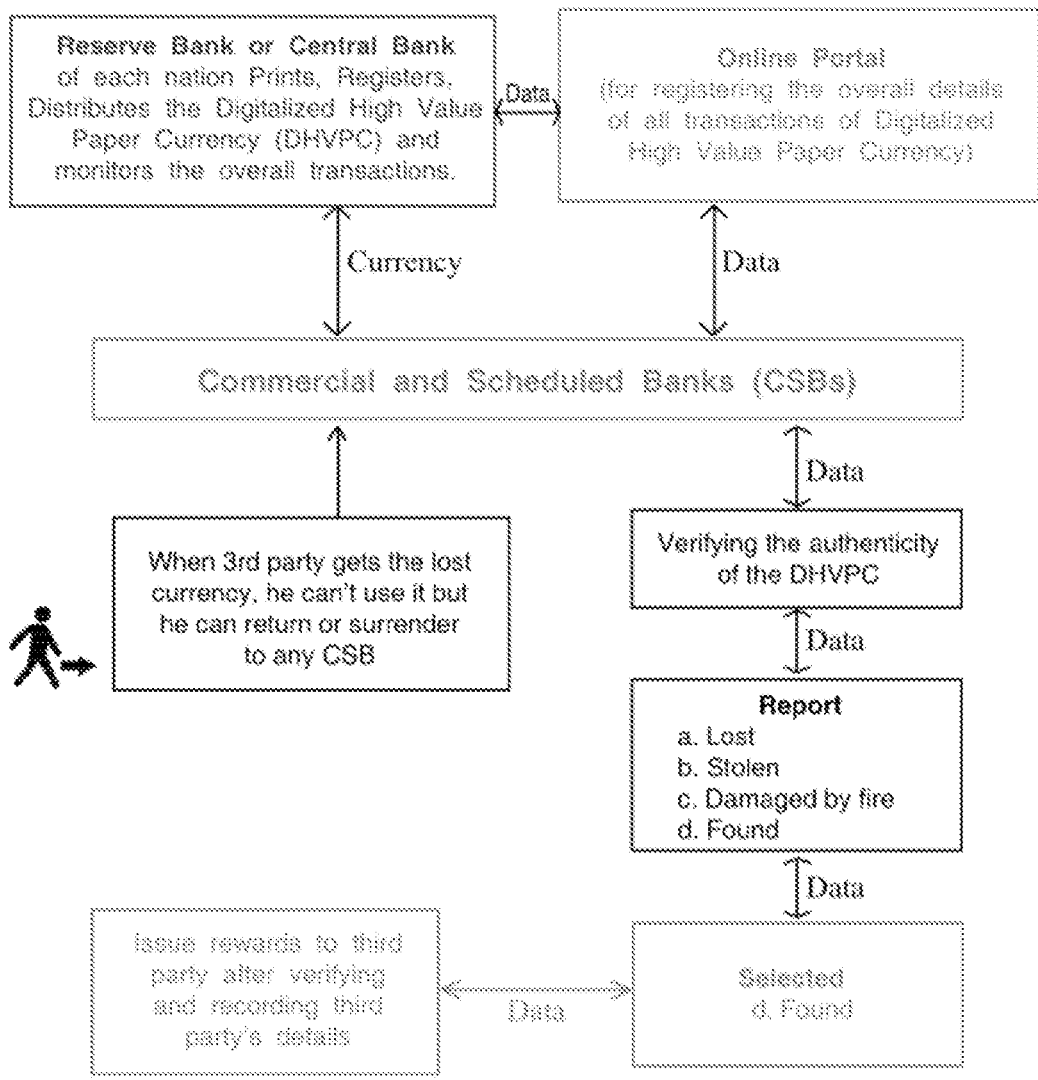

FIG. 22

Note: 1) If the DHVPC holder himself/herself gets the lost DHVPC, he/she can also get the same rewards, which is equal to the pre-fixed penalty.
2) The lost and found DHVPC has to be returned to the distribution cell of Reserve Bank or Central Bank of each nation, provided the value has been credited to the main account of lost Account Holder during reporting of lost DHVPC, or else should be given to the lost Account Holder.

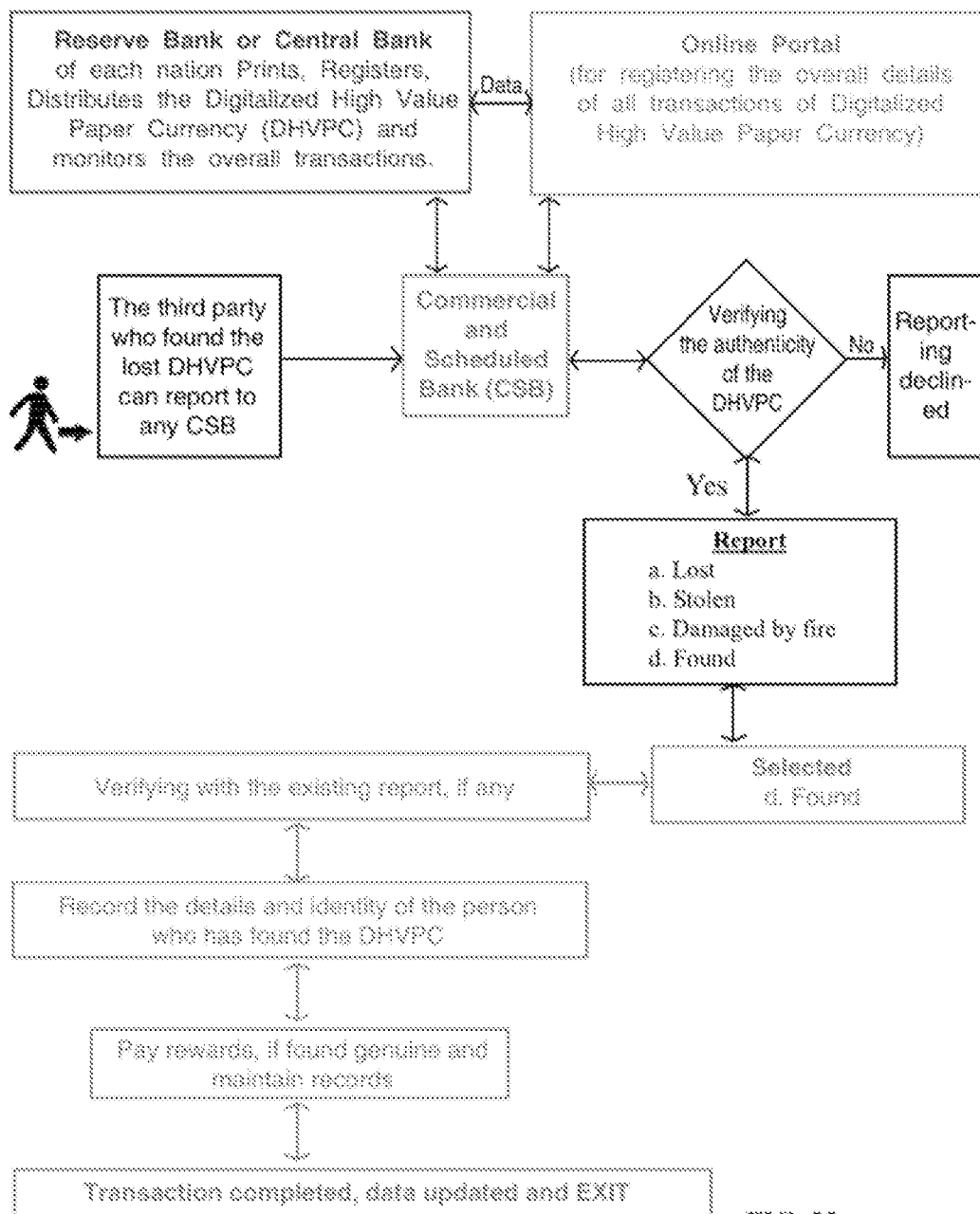

FIG. 23

Note: 1) If the DHVPC holder himself/herself gets the lost DHVPC, he/she can also get the same rewards, which is equal to the pre-fixed penalty.
2) The lost and found DHVPC has to be returned to the distribution cell of Reserve Bank or Central Bank of each nation, provided the value has been credited to the main account of lost Account Holder during reporting of lost DHVPC, or else should be given to the lost Account Holder.

DIGITALIZED HIGH VALUE PAPER CURRENCY

TECHNICAL FIELD

The present invention relates to a novel idea of Digitalized High Value Paper Currency (DHVPC) which has many advantages like complete protection from counterfeiting, 100% protection of value of the currency when it gets stolen, lost, damaged by fire etc., provision of complete monitoring, tracking by Reserve bank/central bank of each nation, blocking of illegal transactions, easiness in handling, transportation of currency, faster scanning of currency for easy registration and improved security. An "Online Portal" is created for this purpose which has the facility for well controlled Registration, Distribution, Recording and Monitoring of overall transactions of DHVPC by Reserve bank or Central bank of each nation (the bank responsible for printing, registration and distributing currency in each nation) to Commercial and Scheduled Banks (CSBs) and from Commercial and Scheduled Banks to Account holders (Customers).

The Reserve bank or Central bank of each nation needs to register all the Digitalized High Value Paper Currencies (DHVPCs) in the Online Portal using the alpha numeric code, Bar Code, QR Code after its printing. The additional features of DHVPC like bar code and QR code will help in enhancement of security of the DHVPC. These along with alpha numeric code (already existing feature of conventional low value paper currency incorporated into DHVPC) will be helping in the registration of DHVPC by scanning of codes and simultaneous data updating will take place in the Online Portal and also helps in tracking of transactions. The first entry of the DHVPC (currency) can be done only by the Reserve bank or Central bank in each nation. Then it gets distributed to the Commercial and Scheduled Banks (CSBs). During the DHVPC registration of the account holder by CSB, a window (ledger) in addition to conventional window for DHVPC transactions will be opened. Simultaneously a similar window will be generated automatically in the Online Portal of Reserve Bank or Central Bank of each nation for the account holder so that automatic updating of transactions of DHVPC (purchase, surrender, and transfer) takes place. After this, the DHVPC can be used for transaction, but each and every time, the data will be automatically updated in the Online Portal. So, no one can introduce their fake/counterfeit currency to the circulation or system. Thus, it will help in blocking the entry of fake currency in to the circulation. It has additional advantages like 100% protection of value of the currency when it gets stolen, lost, damaged by fire etc., provision of complete monitoring, tracking by Reserve bank/central bank of each nation, blocking of illegal transactions, easiness in handling, transportation of currency, faster scanning of currency for easy registration. Thus DHVPC means a combination of physical currency and its data on the Online Portal.

BACKGROUND OF INVENTION

Currency is a very inevitable part in maintaining the economic stability of a nation. The key responsibility of the Reserve bank or Central bank in each nation is the printing and distribution of the currencies and coins. The main disadvantages of low value paper currency are that there is no protection from counterfeiting, no protection of value of the currency when it gets stolen, lost, damaged by fire etc., no provision of complete monitoring and tracking by Reserve bank/central bank of each nation, difficulties in handling, difficulties in transportation of bulk currency, no provision of blocking of illegal transactions, less provisions for scanning of currency.

In most of the countries, the cost/value of a coin is equal to or higher than its printed value. So there is no threat of its counterfeiting. But in the case of "paper currency", counterfeiting is the main threat, especially to the higher denominations. In this context, this new concept of processes can save the situation.

Fake Currency, which cannot be distinguished most of the times between the original currencies, is the major threat to the nations and their Reserve bank or Central bank. Reserve bank or Central bank in each nation is always trying and implementing various methods and strategies to control it.

Demonetization of Rs.500 and Rs.1000 currency is such a kind of method adopted in India, during 2016, to harness fake currency and black money. But later, various incidents of fake currency were caught by the concerned authorities and proved that, it was not as successful as expected. In this context, this innovative concept/invention (in the form of a process) has a vital role.

In India, the Government of India enacted "The High Denomination Bank Notes (Demonetization Act, 1978)", in order to demonetize the currency of the denominational value of one thousand rupees, five thousand rupees or ten thousand rupees, issued by the Reserve Bank of India. This is the time, when there were no technological method to control the counterfeiting of the same. But at the present time, through this process (Invention), there is no room for counterfeiting of high value paper currencies.

Already existing feature of conventional currency "Alpha Numeric Code" which has been less utilized, can be utilized in DHVPC for DHVPC Registrations and transactions. Reserve bank or Central bank in each nation can print the Digitalized High Value Paper Currency (DHVPC) Notes, eg, 1 Lakh, 2 Lakhs, 5 Lakhs and 10 Lakhs etc. same like other currencies, but with additional features like bar code and QR code. These additional features of Bar Code and QR Code will help to enhance the security feature of the DHVPC and these additional features along with already existing feature of alpha numeric code helps in faster scanning for registration of DHVPC.

Protection of value of the currency when it gets stolen, lost, damaged by fire etc. is not possible in low value currency. Whereas in DHVPC system, in the case of currency being stolen, lost or damaged by fire or any other unforeseen situation the Account Holder will not be losing its value and it will be there with a reasonable penalty or administrative expenses, eg. 1% of its printed value (Drawings 20, 21 of 29). A third party can't use the stolen or lost currency but if one gets such a currency, he can hand over the same to the nearest branch of any bank and the branch can give a reward to him.

In the present scenario of low value paper currency, there is no provision of enabling complete monitoring by Reserve bank or central bank of each nation. But here in DHVPC system, The Reserve bank or Central bank in each nation can monitor all of its DHVPCs, at any point of time from anywhere. All transactions through this Digitalized High Value Paper Currency Notes are accountable. At any point of time, the Reserve bank or Central bank can monitor or review an account holder's transactions from anywhere. Through this method, the Reserve bank or Central bank of each nation can review/foresee/monitor the currency concentration in their country at any point of time, Zonal wise, State wise, Regional wise, District wise etc.

No fake currency can enter to the circulation/distribution/system since it begins only at Reserve bank or Central bank in each nation and no parallel entry possible from anywhere in the system.

The Reserve bank or Central bank of each nation can block/bar any number of persons or organizations from this DHVPC transaction unlike that in Conventional Low Value Paper Currency. If any person or organization is blocked in this transaction system, because of their illegal activities, it will help to prevent the transfer of this DHVPC to the unholy hands.

In low value paper currency system, there is difficulty in handling and also transportation. DHVPC can be considered as master currency for high value transactions and transportation, since it is easy to be carried from one place to another or from bank to bank. Through this, the currency handling job/works of Reserve bank officials, CSB officials and Account holders can be reduced drastically, since one Digitalized High Value Currency itself equal to a bundle of low value currency.

STATEMENT OF INVENTION

The present invention relates to a novel idea of Digitalized High Value Paper Currency (DHVPC) with well controlled distribution from Reserve bank or Central bank to the Commercial and Scheduled Banks and from Commercial and Scheduled Banks to Account holder (Currency Holder). The Reserve bank or Central bank in each nation needs to register all the high value currencies in an Online Portal while it is distributed to the Commercial and Scheduled Banks. During the DHVPC registration, a window (ledger) in addition to conventional window for DHVPC transactions will be opened. Simultaneously a similar window will be generated automatically in the Online Portal of Reserve Bank or Central Bank of each nation for the account holder so that automatic updating of transactions of DHVPC (purchase, surrender, and transfer) takes place. The First entry (Registration) of the currency in this Online Portal can be done only by the Reserve bank or Central bank in each nation using the alpha numeric code, bar code, QR code. After this, the DHVPC can be distributed to the Commercial and Scheduled Banks and then it can be used for transaction, but each and every time, the data will get automatically updating in the online portal. So, no one can introduce their fake/counterfeit currency into the circulation or system. Thus, it will support to block the entry of fake currency into the circulation. Moreover, this DHVPC provides safety and protection to its value if it gets stolen, lost, damaged by fire or any other situations beyond our control, tracking, monitoring of currency transactions, blocking of illegal transactions and, easiness in currency handling, easiness in transportation, faster currency scanning for easy registration etc.

Now, the invention is clear from the following description. The nature of the invention and the manner in which it has to be performed is clearly and fully described in the following description.

DETAILED DESCRIPTION OF THE INVENTION

The Reserve bank or Central bank in each nation can print the Digitalized High Value Paper Currency (DHVPC) Notes, eg, 1 Lakh, 2 Lakhs, 5 Lakhs and 10 Lakhs etc. same like other currencies, but with additional features like bar code and QR code. The additional features of DHVPC like bar code and QR code will help in enhancement of security of the DHVPC. These along with Alpha Numeric Code (already existing feature of conventional low value paper currency incorporated into DHVPC) will be helping in the registration of DHVPC by scanning of codes and simultaneous data updating will take place in the Online Portal. These will also make tracking of transactions possible. (Drawing 1 of 29).

The Reserve bank or Central bank in each nation needs to open a new online portal eg. www.dhvpc.rbi.gov.in, in India, for this currency registration, distribution/circulation and monitoring. In order to perform the functions, the Reserve Bank or Central Bank of each nation should establish a DHVPC Department under which there should be 4 cells—Printing Cell, Registration Cell, Distribution Cell and Monitoring Cell. The Printing Cell prints the DHVPC and transfer the DVPCs to Registration cell. The Registration Cell will register all the DHVPCs utilizing alpha numeric code, bar code and QR code. Thus a DVPC is a combination of physical currency and its data in the Online Portal, where it is recording all its transactions.

Apart from the registration of DHVPCs, it will also register the CSBs and Account holders. After the registration of DHVPC, the Registration Cell will transfer the same to distribution cell. The Distribution Cell will distribute the DHVPCs to CSBs. If Reserve Bank or Central Bank of each nation is convinced with the infrastructure and facilities of CSB, the Reserve Bank/Central Bank of each nation will first approve the CSB and then issue a software module which can be linked with the CSB and online portal of Reserve Bank/Central bank. Once the CSB is linked with the software module, then it can provide DHVPC registration for account holders and becomes ready for DHVPC transactions. (Drawings 3 and 4 of 29).

During the DHVPC registration, a window (ledger) in addition to conventional window for DHVPC transactions will be opened (Drawings 5 and 6 of 29). Simultaneously a similar window will be generated automatically in the Online Portal of Reserve Bank or Central Bank of each nation for the account holder so that automatic updating of transactions of DHVPC (purchase, surrender, and transfer) takes place.

The Registered Commercial and Scheduled Banks (CSBs) must have a hyperlink in their website to access the online portal for DHVPC transactions and at the same time to form/create a track record of DHVPC transactions and its sources.

The Reserve bank or Central bank in each nation can print and distribute the Digitalized High Value Paper Currency Notes to the registered Commercial and Scheduled Banks through the Online Portal, after registration of currencies and physically transfer the currency to the Banks and its branches. The 'Registration' of DHVPC is possible only through Reserve bank or Central bank of each nation. No other Bank or Institution has the same authority or responsibility. The First entry of the currency can be done only by the Reserve bank or Central bank in each nation. After this, the high value currency can be used for transaction, but every time, the data will be automatically updating in the Online Portal. So, no one can introduce their fake/counterfeit currency into the circulation or system. Thus, it will provide 100% prevention of entry of fake currency into the circulation. This way the entry of fake currency or counterfeiting can be well controlled and it is a foolproof method or technology.

The currency Registration window/module can be accessed only by the concerned DHVPC Registration Cell officials of Reserve bank or Central bank officials of each nation, who are working in the Registration Cell under DHVPC Department. Registered Commercial and Scheduled Banks can get this Digitalized High Value Paper Currency from the Distribution Cell of DHVPC and then to its account holders. Here, the Reserve bank or Central bank of each nation acts as the "System Administrator" and all other Registered Scheduled and Commercial Banks and its branches act as "Registered Banks" and Account Holders as "Individual" or "Corporate", with designated User ID and password, issued through Registered Scheduled and Commercial Banks. One Corporate or Person can have more than 1 User ID, depending on the number of accounts they are maintaining in the Banks. The Commercial and Scheduled banks can distribute/issue the DHVPC to its customers on the basis of their request after debiting the value (amount) from the main Account and crediting to the DHVPC Account. Drawing 2 of 29 is illustrating very clearly the overall Processes of the Digitalized High Value Paper Currency.

The Currency Holder can access the Online Portal through a Registered Scheduled Bank or through ATM/CDM or through Net banking and can do transactions and simultaneously data will get automatically updated in the Online Portal. The registered users can purchase the DHVPC from home bank and surrender the DHVPC to any Bank branch/different bank and can credit the value to the concerned Bank Account. (Drawings 7, 9, 10 of 29), If CSB is different branch of the same bank, then the CSB can access the account on the basis of account details and if the CSB is a different bank, then the CSB can access the account on the basis of the Alpha-Numeric code of DHVPC. He/she can also transfer that to another registered user, provided one of the registered user is having account in that bank (Drawings 8, 11 of 29). Inter banking transactions are also possible through this. (Drawings 7, 8 of 29). The registered users can purchase the DHVPC from the ATMs having facility for the issue of DHVPC by incorporating software and special trays, after debiting the value from their CSB main Account and crediting to the DHVPC account (Drawings 12 and 13 of 29). The account holder can also surrender DHVPC to CDMs having DHVPC accepting facility by incorporating soft ware and special trays, after debiting the value (amount) from their DHVPC Account and crediting to the CSB main Account (Drawings 14 and 15 of 29).

In order to perform the transactions of DHVPC in the ATM/CDM, a suitable software module also has to be incorporated in the existing software. All DHVPCs of various values can be of equal size and dimensions but can be varied in color. This is to facilitate to accommodate DHVPC' of various values in a single currency tray (Additional Hardware) of CDM. The Account holder has to insert his debit card (ATM Card) to access the CDM, after few procedural steps, including entering the Alpha-Numeric code of the DHVPC, insert the DHVPC in the CDM for surrendering. Then the software (online portal) will verify its authenticity in connection with the Account holder and the value of DHVPC. If the authentication is successful, then the CDM will accept the DHVPC. Otherwise CDM will reject the DHVPC. In a similar to issue DHVPC through ATM, there will be different trays based on the denomination of DHVPC and there should be a corresponding software.

Whenever 2 account holders are together and they wish to exchange DHVPC, they can access the online portal through ATM/CDM and automatically update the data of DHVPC exchange and they can physically exchange the DHVPC (Drawing 16 and 17 of 29). The Account Holders can do the transfer of DHVPC between them, after accessing the online portal of their CSB accounts from anywhere through Net banking and at the same time needs to do DHVPC exchange physically. (Drawings 18 and 19 of 29).

In the case of currency being stolen, lost or damaged by fire or any other unforeseen situation the Account Holder will not be losing its value and it will be there with a reasonable penalty or administrative expenses, eg. 1% of its printed value (Drawings 20, 21 of 29). A third party can't use the stolen or lost currency but if one gets such a currency, he can hand over the same to the nearest branch of any bank and the branch can give a reward to him. Such lost & found DHVPC has to be returned to the Distribution Cell of Reserve Bank or Central Bank of each nation, provided the value has been credited to the main account of lost Account Holder during reporting of the lost DHVPC or else the lost DHVPC should be given to the lost Account Holder. The looser can get another currency by paying penalty as mentioned above or can get the value credited to the main Account after deducting the pre-fixed penalty. All the stake holders of this DHVPC Notes are 100% tension and risk free. At any unforeseen situations, the currency holder will get the protection of its value (Drawings 22, 23 of 29).

The Reserve bank or Central bank in each nation can monitor all of its currencies, at any point of time from anywhere. All transactions through this Digitalized High Value Paper Currency Notes are accountable. Through this method, the Reserve bank or Central bank of each nation can review/foresee/monitor the currency concentration in their country at any point of time, Zonal wise, State wise, Regional wise, District wise etc. (Currency Density/Concentration means, the quantity of Currency available in a Geographical area (square Kilometer-wise) or Population-wise (per Lakh People). The Reserve Bank or the Central Bank of each Nation can monitor the DHVPC transactions CSB wise or ATM/CDM wise or Net banking wise or DHVPC wise or Account holder wise. Transactions of each and every currency can be tracked, because every transaction leaving a digital evidence of the same, through which tracking is possible. This will help to un-earth various unauthorized and illegal activities using currency. (Drawings 24-29 of 29).

The Reserve bank or Central bank of each nation can bar/block any number of persons or organizations from this DHVPC transaction. If any person or organization is barred/blocked in this transaction system, because of their illegal activities, it will help to prevent the transfer of this DHVPC to the unholy hands. The software using for it should be a reliable one and should have the capacity to handle huge data-base of DHVPCs and its transaction details. Commercial and Scheduled Banks can view their supplied currency and non-supplied (received through transactions) currency under their control.

The Registered Commercial and Scheduled Banks can monitor its account Holders. A currency/account holder can monitor/view his/her currency details through Net banking.

Each and every time the DHVPC has a registered holder, a party or organization or bank, unlike other currency unlike other currency, either a party or organization or bank which helps in tracking the transaction.

DHVPC can be considered as master currency for high value transactions and transportation, since it is easy to be carried from one place to another or from bank to bank. Through this, the value of new currency, which can be packed in a suitcase, will be equal to the value of a container load. Therefore, through this method, unnecessary transportation of currency in heavy loads to long distances can be avoided. Through this, the currency handling job/works of banking officials can be reduced drastically, since one Digitalized High Value Currency itself equal to a bundle of low value currency.

Using the same process/methods, the Low Value Paper Currencies can also be digitalized, like 500, 1000, 2000 etc . . . , so, its fake currencies/counterfeits can be controlled.

DRAWINGS

The salient features of the invention are described in detail with reference to various figures showing essential aspects of the invention. Each figure of the drawing illustrates certain features which are briefly described after the drawings, Drawings—Brief Description:

Drawing 1 of 29: Pattern of Digitalized High Value Paper Currency (DHVPC)

This figure illustrating the pattern of the DHVPC for India. Here, mainly highlighted the additional features in the DHVPC compared to conventional paper currency. These additional features of DHVPC like bar code and QR code will help in enhancement of security of the DHVPC. These along with alpha numeric code (already existing feature of conventional low value paper currency incorporated into DHVPC) will be helping in the registration of DHVPC by scanning of codes and simultaneous data updating will take place in the Online Portal and also helps in tracking of transactions. The drawing shows a general outlook of the DHVPC.

Drawing 2 of 29: Over all Processes of Digitalized High Value Paper Currency—Schematic Diagram.

This figure clearly describing the overall processes of Digitalized High Value Paper Currency. The Reserve Bank/Central bank of each nation has to establish a DHVPC department and under this department there will be 4 major cells namely Printing cell, Registration cell, Distribution cell and Monitoring cell. The Printing Cell will print the DHVPC and Registration cell will register the DHVPCs in the Online Portal of the Reserve bank or Central bank, before its distribution to the CSBs and DHVPC account holders by the Distribution cell. Monitoring cell can monitor all the DHVPC transactions. Monitoring can be done CSB wise, ATM/CDM wise, Net banking wise, Account holder wise and DHVPC wise. The registration of overall details of all transactions of DHVPC will be done in the Online Portal.

The Commercial and Scheduled banks can access the online portal as Registered Bank, using their user ID and password. The Commercial and Scheduled Banks can distribute the DHVPC to its customers on the basis of their request, using the amount in the account, enter the details of the customers and simultaneously the data gets automatically updated in the Online Portal and makes the customers registered DHVPC Account holders. The Account holders can do transaction (purchase, surrender and transfer of DHVPC) between other customers through Commercial and Scheduled banks or after accessing ATM/CDM or through Net banking. For example, Account holder-1 can transfer physical currency to Account holder-2 through scheduled bank or ATM/CDM or Net-banking to Account holder-2 and simultaneously data updating can be done. Likewise between Account holder-2 and 3.

Note—For the first time an account holder can get DHVPC only from a branch of CSB or from ATM having facility to issue DHVPC. After getting the DHVPC from CSB or ATM, account holders can transfer DHVPC to any other registered account holder through either CSBs or through net banking or through ATM/CDM.

Hyperlink in the online portal:—The Registered Commercial and Scheduled Banks (CSBs) must have a hyperlink in their website to access the online portal for DHVPC transactions and at the same time to form/create a track record of DHVPC transactions and its sources.

The First entry of the currency can be done only by the Reserve bank or Central bank in each nation during registration. After this, the Digitalized High Value Currency can be used for transaction through CSB, but every time, the data will get automatically updated in the Online Portal. So, no one can introduce their fake/counterfeit currency into the circulation or system. Thus, it will support to block the entry of fake currency into the circulation.

Drawing 3 of 29—Printing, Registration and Distribution of DHVPC-Schematic Diagram Here it clearly describes regarding the Printing, Registration and Distribution process of DHVPC. An Online Portal will be created by Reserve Bank or Central Bank of each nation for DHVPC transactions. In order to perform the functions the Reserve Bank or Central Bank of each nation should establish a DHVPC Department under which there should be 4 cells—Printing Cell, Registration Cell, Distribution Cell and Monitoring cell. The Printing Cell prints the DHVPC and provides the details to Registration cell. The Registration Cell will register all the DHVPCs. Apart from the registration of DHVPCs, it will also register the CSBs and Account holders. After the registration of DHVPC, the Registration Cell will transfer the same to distribution cell. The Distribution Cell will distribute the DHVPCs to CSBs. From a CSB, an account holder can purchase DHVPC. An account holder can first purchase DHVPC only through the CSB counter or through ATM and becomes a DHVPC account holder. An account holder can do transactions through banks, ATM/CDM or through Net banking.

Drawing 4 of 29: Registration of CSB with Online Portal of Reserve Bank or Central Bank of Each Nation—Schematic Diagram This drawing describes in detail on the steps in the registration of CSB with Online Portal of Reserve Bank or Central Bank of each nation. For the same purpose, the CSB needs to submit an application to Reserve Bank/Central Bank of each nation. Then the Reserve Bank/Central Bank of each nation will verify the infrastructure and facilities of CSB. If Reserve Bank or Central Bank of each nation is convinced with the infrastructure and facilities of CSB, the Reserve Bank will approve the CSB and then issue a software module which can be linked with the CSB and Online Portal of Reserve Bank/Central bank. Once the CSB is linked with the software module, then it can provide DHVPC registration for CSB and becomes ready for DHVPC transactions. Now the CSB can provide DHVPC registration for its account holders.

Drawing 5 of 29: Registration of Account Holders by CSB with the Online Portal of Reserve Bank or Central Bank of Each Nation—Schematic Diagram.

This drawing describes in detail the steps involved in Registration of account holder by CSB with the Online Portal of Reserve Bank or Central Bank of each nation. Account holder needs to submit an application to the CSB for DHVPC Registration. To provide DHVPC registration to the account holders of CSB, the CSB should be already registered with the online portal of Reserve Bank or Central Bank of each nation. After approving the application form of Account holder, the CSB will process it, access the Online Portal and will complete the formalities. Another ledger (window) will be opened in the account of the account holder. All the DHVPC transactions will be recorded in this DHVPC window in connection with the main window. At the same time transaction window will be opened in the Online portal of Reserve Bank or Central Bank of each nation. Thus account holder will become a registered Account holder for DHVPC and Account is now ready for DHVPC transactions.

Drawing 6 of 29: Ledger Pages of Conventional and DHVPC Accounts.

This figure clearly describes the overall process of ledger entry of DHVPC transaction in connection with the main ledger. During the DHVPC registration, an additional window (ledger) for DHVPC transactions will be opened. Simultaneously a window will be opened in the Online portal of Reserve Bank or Central Bank of each nation. In table 1 of Drawing 6, the conventional/main ledger for account is shown where sl. no, date, particulars, credit, debit and balance are shown. In tables 2 and 3 of Drawing 6, the ledger of DHVPC Account Holder 1 and Account Holder-2 respectively are shown where, there are both main window and DHVPC window showing issue of DHVPC to the account of account holder-1, surrender of DHVPC by Account Holder land transfer of DHVPC from Account Holder 1 to 2. During the purchase of DHVPC, the value will be debited from the main account and credited to the DHVPC window (account) of account holder-1 (as shown in table 2). During surrender of DHVPC, the value will be debited from the DHVPC window and credited to the main window of DHVPC holder 1 and 2 (as shown in tables 2 and 3). During transfer of DHVPC from account holder 1 to account holder 2, the value will be debited from the DHVPC window of account holder 1 and credited to the DHVPC window of account holder 2 (as shown in tables 2 and 3).

Drawing 7 of 29: Transaction Through Banks—Purchase and Surrendering of DHVPC—Schematic Diagram.

It describes in detail about the functions/activities involved in the transaction through Commercial and Scheduled Banks (CSB) regarding purchasing/issuing and surrendering of DHVPC. The CSBs (CSB-1, 2 and 3) are different branches of same bank/branches of different bank. The CSBs can do the transactions of DHVPC between CSBs (for example CSB-1 can do transaction of DHVPC with CSB-2, simultaneously data will get updated automatically in the Online Portal and likewise in the same manner between CSB-2 and CSB-3). Assume that account holder-1 is a person holding an account in CSB-1, account holder-2 is a person holding an account in CSB-2 and account holder-3 is a person holding an account in CSB-3. Account holder 1, 2 and 3 can purchase and surrender DHVPC and simultaneously the data will get updated automatically in the Online Portal by their respective home branches of bank (here CSB-1, 2 and 3 as shown in the figure). In general, any account holder can surrender the DHVPC at any CSB, but can purchase DHVPC from only home bank. Account holder-1, 2, 3 can purchase the DHVPC from the CSB-1, 2 and 3 respectively with simultaneous debiting of value from the main account and crediting of value to the DHVPC account of account holders. Account holder-1 can surrender his DHVPC to CSB-2 but can't purchase the DHVPC and after surrendering, the value will be debited from the DHVPC account and credited to the main account of Account Holder-1 (as shown in the figure). Likewise, Account holder-1 can also surrender his DHVPC to CSB-3. Similarly, Account Holder-3 can surrender his DHVPC to CSB-2 but can't purchase the DHVPC from CSB-2 and after surrendering; the value will be debited from the DHVPC account and credited to the main account of Account Holder-3 (as shown in the figure). Likewise, Account holder-3 can surrender his DHVPC to CSB-1. If CSB is different branch of the same bank, then the CSB can access the account on the basis of account details and if the CSB is a different bank, then the CSB can access the account on the basis of the Alpha-Numeric code of DHVPC. The Registered User can surrender the DHVPC at the bank counter and then the value will be debited from the DHVPC account and credited to his main Account.

Drawing 8 of 29: Transaction Through Banks—Transfer of DHVPC—Schematic Diagram.

It describes in detail about the functions/activities involved in the transaction through Commercial/Scheduled Banks (CSBs) and transferring of DHVPC. The CSBs (CSB-1, 2 and 3) are different branches of same bank/branches of different banks. The CSBs can do the transactions of DHVPC between CSBs (for example CSB-1 can do transaction of physical currency with simultaneous data updating with CSB-2 after accessing the online portal and likewise in the same manner between CSB-2 and CSB-3). Account holder-1 can transfer physical currency to Account holder-2 through CSB-1 after CSB-1 access the Online Portal and automatically update the data. (As shown in the figure). Similarly, Account holder-3 can transfer his DHVPC to Account holder-2 through CSB-3. Account holder-3 can also transfer his DHVPC to Account holder-2 through CSB-2. (As shown in the figure). Similarly Account holder-1 can also transfer his DHVPC to Account holder-2 through CSB-2. The main condition for transfer of DHVPC between 2 account holders of different banks is that the transaction should take place at the home bank of the account holder from whom DHVPC is transferred. Here the value will be debited from the DHVPC Account of $1^{st}$ Account holder who is transferring DHVPC to another Account holder and the value will be credited to the DHVPC account of $2^{nd}$ Account holder. Likewise between Account holder 3 and 2.

Drawing 9 of 29: Transaction Through Banks—Purchase of DHVPC—Process Diagram.

This process diagram describes in detail about the overall process/steps involved in the purchase of DHVPC through banks. For this, the Account holder can approach the CSB branch. The CSB branch officials can access the online portal using their ID and then approve the Account holder using his/her details. Then they can select the choice of Purchase from the 3 options-viz-(a). Purchase, (b). Surrender (c). Transfer. A question is displayed on the screen "Do you want to purchase DHVPC?". If "Yes" the CSB officials can enter the requirements of the account holder and verify it with Account balance or else declined the transaction. If there is any shortage of fund in account, CSB can collect the same in the Account. Then can update the data and issue the DHVPC to the Account Holder after debiting the value from the main account and crediting the value to the DHVPC account of the Account holder.

Drawing 10 of 29—Transaction Through Banks—Surrender of DHVPC—Process Diagram.

This process diagram describes in detail about the over-all process/steps involved in the surrender of DHVPC through banks. Here, after approving the account holder using Account details, the CSB officials can select the choice of Surrender from the 3 options-viz—(a). Purchase, (b). Surrender (c). Transfer. After verifying the authenticity of DHVPC, a question "Do you want to surrender DHVPC?" will be displayed on the screen. If "yes" the transaction will be confirmed through OTP to Account holder or else declined the transaction and after that surrendering of DHVPC to CDM will be done. CDM will verify the DHVPC and if "Yes" the value will be debited from the DHVPC Account and credited to the main Account of Account Holder and if not correct transaction will be declined.

Drawing 11 of 29—Transaction Through Banks—Transfer of DHVPC—Process Diagram.

This process diagram describes in detail about the over-all process/steps involved in the transfer of DHVPC through banks. For the transfer of DHVPC to a third party, the CSB officials can verify the details of DHVPC, using its number (Alpha-Numeric Code) and verify the Account holder. Then they can select the choice of Transfer from the 3 options- viz—(a). Purchase, (b). Surrender (c). Transfer. After verifying the authenticity of DHVPC, a question "Do you want to transfer DHVPC?" will be displayed on the screen. If everything is correct, CSB officials can enter the details of the Second Account holder (Receiving party), who must be a registered Account Holder for DHVPC, otherwise the transaction will be declined. Then the screen will display the details of the Account holder-2 and confirmation will be made to the Account holder-1 through OTP. Then the CSB officials confirm/witness the physical handover of the DHVPC and then update the data. Here the value will be debited from the DHVPC account of the account holder 1 and credited to the DHVPC account of Account holder-2. Then both parties will get confirmation messages to their registered mobile and email.

Drawing 12 of 29: Transaction Through ATMs—Issue of DHVPC-Schematic Diagram.

It describes in detail about the functions/activities involved in the transaction through ATMs for the issuance of DHVPC. The ATMs are the functional device or extended arms of the Commercial and Scheduled Banks. Here the registered Account Holders for DHVPC (Account holders 1, 2 and 3) can get DHVPC from the ATMs, after accessing the ATM using the ATM card of the Commercial and Scheduled Banks (CSBs), provided if the Account holder maintain sufficient fund in the Account. Then the DHVPC will be issued to the Account Holder after debiting the value from the main account and crediting the value to the DHVPC account of the Account holder.

Drawing 13 of 29: Transaction Through ATMs—Issue of DHVPC—Process Diagram.

This process diagram describes in detail about the functions/activities involved in the transaction through ATMs for the issuance of DHVPC. The registered Account Holders for DHVPC can get DHVPC from the ATMs, after accessing the ATM using the ATM card and its password, of the Commercial and Scheduled Banks (CSBs), provided if the Account holder maintains sufficient fund in the Account. When the Account holder accesses the online portal, the portal will verify the authenticity of the Account holder. If approved the authenticity, then it can proceed further, otherwise it will be declined. After the approval, the Account holder can choose the 'Purchase' option from the 'Choice of Selection'. A question "Do you want to purchase DHVPC?" will be displayed on the screen. Then the Account holder can enter his requirements like value of the DHVPC and the number of DHVPC. Then the Online portal will verify the requirements with account balance and if sufficient fund is there in the Account, the DHVPC will be issued, otherwise sufficient fund can be credited to the account. Here value will be debited from the main account and credited to the DHVPC account of the Account holder and then DHVPC will be issued.

Drawing 14 of 29: Transaction Through CDMs—Surrendering of DHVPC—Schematic Diagram.

It describes in detail about the functions/activities involved in the surrendering of DHVPC to CDM and then the value gets credited to the main Account of Account Holder. Then the Account Holder can do the transfer or partial withdrawal of credited money, same like any other conventional transaction. Account holder-1, 2 & 3 are independent Account holders, they can access the CDM and surrender the DHVPC and the value will be debited from the DHVPC window and credited to the respective Account Holder's main account with simultaneous updating of the data. Here the value will be debited from the DHVPC account and credited to the main account of the account holder 1, 2 and 3.

Drawing 15 of 29: Transaction Through CDMs—Surrendering of DHVPC—Process Diagram.

This process diagram describes in detail about the over-all process/steps involved in the surrendering of DHVPC to CDM, which has the facility (both hardware and software) to accept DHVPC, and then the value gets credited to the Account Holder's main account. The process begins when the Account holder access the CDM using ATM card. If the ATM card is valid and pin is correct, it will support the further process or else decline the transaction. Then select the "DHVPC Surrender" from the menu, then enter the DHVPC number. The Online Portal will verify the authenticity of the DHVPC and if it is correct will move to the next step or else will decline the transaction. A question "Do you want to surrender DHVPC" will be displayed on the screen. If Yes, will go to next step or else decline the transaction. Then, the online portal will sent a confirmation of the transaction through OTP (One Time Password) to the Account Holder to his mobile or email and the same need to be reentered in the CDM. If it is correct, will move to the next step, ie, the door of the currency tray will open or else will reject the transaction. The Account holder can put the DHVPC in the tray and then it will be closed. The CDM will check the authenticity of the currency and if it is correct, the value will be credited to the main Account of Account holder or else the DHVPC will be ejected from the CDM. Here the value will be debited from the DHVPC account and credited to the main account of the account holder. The Account holder will get the transaction slip in both cases.

Drawing 16 of 29: Transaction Through ATM/CDMs—Transfer of DHVPC when 2 Account Holders are Together—Schematic Diagram.

It describes in detail about the functions/activities involved in the transaction when 2 Account holders are together for DHVPC exchange after accessing the online portal through ATM/CDM. Account holder 1 & 2 are independent Account holders, and whenever Account holder-1 wants to exchange the DHVPC with Account holder-2, the Account holder-1 can access the online portal through ATM/CDM. Then Account holder-1 can physically hand over the DHVPC to Account holder-2 with simultaneous updating of data on the Online portal and similarly from Account holder 2 to account holder 1. The value will be debited from the DHVPC account of Account holder-1 and credited to the DHVPC account of the account holder-2 and vise versa, if the transfer of DHVPC is from Account holder 2 to Account holder 1.

Drawing 17 of 29: Transaction Through ATM/CDMs—Transfer of DHVPC when 2 Account Holders are Together—Process Diagram.

This process diagram describes in detail about the overall process/steps involved in the transaction of DHVPC between two Account Holders through ATM/CDM. The two Account holders should be near to each other and physically they have to exchange the DHVPC and updating of the data will take place through online portal. The process begins when the Account holder-1 access the ATM/CDM using his ATM card. If the pin is correct and ATM card is valid, then it will support further process or else decline the transaction. Then select the "Transfer" from the menu and then enter the DHVPC number (Alpha-Numeric Code). Then a question will be displayed on screen "Do you want to transfer DHVPC?". If Yes, will go to next step or else decline the transaction. The Online Portal will verify the authenticity of the DHVPC and if it is correct will move to the next step or else will decline the transaction. Then, the ATM/CDM will ask the details of Account holder-2 and the details will be displayed in the screen. If the details about the Account holder-2 is correct, will move to the next step or else will decline the transaction. Then, the online portal will sent a confirmation of the transaction through OTP (One Time Password) to the Account Holder-1 to his mobile or email and the same need to be entered in the online portal. If it is correct, will move to the next step, ie, the ATM/CDM will ask "Whether physically transferred the DHVPC? If Yes, will move to the next step or else decline the transaction. If it is correct, the value will be debited from the DHVPC Account of Account Holder-1 and credited to the DHVPC Account of Account holder-2 and both Account Holders will get confirmation messages and a transaction slip will be given to Account Holder-1.

Drawing 18 of 29: Transaction Through Net Banking—Transfer of DHVPC—Schematic Diagram.

It describes in detail about the functions/activities involved in the transaction directly through Net banking. The Account Holders can do the transfer of DHVPC between them, after accessing the online portal from anywhere through Net banking. The Account Holders have to access the online portal for data updating and at the same time need to do DHVPC exchange physically. For example if Account holder-1 wishes to transfer the DHVPC to Account holder-2, Account holder-1 can access the online portal and at the same time he has to hand over DHVPC to Account holder-2 with simultaneous automatic data updating in the Online Portal. The value will be debited from the DHVPC Account of Account Holder-1 and credited to the DHVPC Account of Account holder-2 and vice-versa from Account holder-2 to account holder-1.

Drawing 19 of 29: Transaction Through Net Banking—Transfer of DHVPC—Process Diagram.

This process diagram describes in detail about the overall process/steps involved in the transfer of DHVPC between two Account Holders through online. The two Account holders should be near to each other and physically they have to exchange the DHVPC and the data updating will take place through online simultaneously. The process begins when the Account holder-1 accesses the online portal using his User Name and password of the Net banking. If the User Name and password is correct, then it will support further process or else decline the transaction. Then select the "Transfer" from the menu and then enter the DHVPC number (Alpha-Numeric Code). Then a question will be displayed on screen "Do you want to transfer DHVPC?". If Yes, will go to next step or else decline the transaction. Then the Online Portal will verify the authenticity of the DHVPC and if it is correct will move to the next step or else will decline the transaction. After that, the Online Portal will ask the details of Account holder-2, after entering the details, the same will be displayed in the screen. If the details of the Account holder-2 is correct, will move to the next step or else will decline the transaction. Then, the Online Portal will sent a confirmation of the transaction through OTP (One Time Password) to the Account Holder-1 to his mobile or email and the same need to be reentered in the online portal. If it is correct, will move to the next step, ie, the Online Portal will ask "whether physically transferred the DHVPC? If yes, will move to the next step or else decline the transaction. If it is correct, the value will be debited from the DHVPC Account of Account Holder-1 and credited to the DHVPC Account of Account holder-2 and both Account Holders will get confirmation as a sign of completion of the transaction.

Drawing 20 of 29: Crediting the Value and Getting New DHVPC, when the DHVPC is Lost or Stolen or Damaged by Fire—Schematic Diagram.

It describes in detail about the crediting the value and getting new DHVPC, when the DHVPC is lost or stolen or damaged by fire. In these unforeseen situations, the Account Holder has to report the same to his/her Commercial and Scheduled Bank. Then, the CSB after verifying the authenticity of the DHVPC will update the same in the online portal and CSB officials can debit the value from the DHVPC account and credit the value to the main account of the Account holder after deducting penalty. The account holder if he wants can also purchase new DHVPC after CSB officials debit the value from the main account and credit the value to the DHVPC account. The account holder can also wait for a preset days (in the case of lost or stolen only), then need to pay the penalty and get a new currency.

Drawing 21 of 29: Crediting the Value and Getting New DHVPC, when the DHVPC is Lost or Stolen or Damaged by Fire—Process Diagram.

This process diagram describes in detail about the over-all process/steps involved in the situation for crediting the value and getting new DHVPC when DHVPC is lost or stolen or damaged by fire. The DHVPC holder can approach any CSB to report the same, but crediting the value of DHVPC to the account is possible only in the home branch or branches of his/her bank. The CSB officials can access the online portal using their User ID and password and can report the same in the online portal. For this, the officials can select the "Report" and then select "Lost" or "Stolen" or "Damaged by Fire", then enter the DHVPC details. Then, if the DHVPC holder likes to get it's value, then the CSB can debit the value to the DHVPC account and credit the value to his/her main Account, after deducting the pre-set penalty. If the DHVPC holder likes to get another DHVPC, then the CSB should verify the requirements of the Account Holder with the account balance and if sufficient fund is there, CSB can issue another DHVPC. If insufficient fund is there, fund can be credited to the main account of the Account holder. Then after debiting the value from the main account and crediting to the DHVPC account of the Account holder the DHVPC will be issued. All these will be automatically updated in the online portal.

Drawing 22 of 29: When Third Party Gets the Lost DHVPC—Schematic Diagram.

It describes in detail about the situations when the lost DHVPC is found by third party. The third party can't use the found DHVPC, rather he/she can handover the same to any CSB and the data can automatically update the same in the online portal, verify the same with the reports given by the Account holder who has lost the DHVPC. If the CSB finds its authenticity, it can give a suitable preset reward to the third party. The CSB can then send back the DHVPC to the Account Holder's branch or else to the Reserve Bank or Central Bank of each nation, if the value of the same is credited to the main Account of Account Holder or else should be given to the lost party (if of the same branch and value not credited to the main account of Account holder), If the DHVPC holder himself gets the lost DHVPC, he/she can also get the same reward given to the third party which is equal to the pre-fixed penalty.

Drawing 23 of 29: When Third Party Gets the Lost DHVPC—Process Diagram.

This process diagram describes in detail about the over-all process/steps involved in the situation when a third party gets the lost DHVPC. The third party can approach any CSB to hand over the same. The CSB officials can access the online portal using their User ID and password and can report the same in the online portal after verifying the authenticity of DHVPC. For this, the officials can select the "Report" and then select "Found", then have to verify with the existing report if any. Then record the details and identity of the person who has found the DHVPC. If the same DHVPC has been already reported in the "Lost" or "Stolen" or "damaged" category, the same will be displayed on the screen of Online portal of CSB officials, accordingly the CSB can issue the preset rewards to the 3rd party at that time or later. All these will be updated automatically in the online portal. The CSB can then send back the DHVPC to the Account Holder's branch or else to the Reserve Bank or Central Bank of each nation, if the value of the same is credited to the main Account of Account Holder or else should be given to the lost party (if of the same branch and value not credited to the main account of Account holder), If the DHVPC holder himself gets the lost DHVPC, he/she can also get the same reward given to the third party which is equal to the pre-fixed penalty.

Drawing 24 of 29: Monitoring Process of Transactions by Reserve Bank or Central Bank of Each Nation—Schematic Diagram.

It describes in detail about the monitoring process of all DHVPC transactions by Reserve Bank or the Central Bank of each Nation. The Reserve Bank or the Central Bank of each Nation can monitor the DHVPC transaction CSB wise or ATM/CDM wise or Net Banking Wise or DHVPC wise or Account holder wise. For example, in case of CSB wise monitoring, Reserve Bank or Central Bank of each nation can monitor the transactions between CSB-1 and CSB-2. Likewise it can monitor the transactions between CSB-2 and CSB-3 and so on. In case of monitoring of transaction by surrendering DHVPC through CDM and issuing DHVPC through ATM, Reserve Bank/central bank of each nation can monitor the transactions through ATM/CDM (Here ATM/CDM-1, 2 3 and so on). In case of monitoring of transactions through Net banking, Reserve Bank can monitor exchange of physical currency and simultaneous data updating from account holder 1 to account holder 2 and likewise between account holder 2 and 3 and so on. In DHVPC wise transactions, Reserve Bank can monitor the overall transactions of DHVPC1, 2, 3 etc. In Account holder wise transactions, Reserve Bank can monitor the transactions between Account holders 1, 2, 3 etc.

The officials of Reserve Bank or the Central Bank of each nation can access the online portal for monitoring purpose. Then, the monitoring can be done CSB wise or ATM/CDM wise or Net banking wise or Account holder wise or DHVPC wise. Again, monitoring can be done on the basis of particular duration, particular State, District etc.

Drawing 25 of 29: Monitoring Process of Transactions Through CSB by Reserve Bank or Central Bank of Each Nation—Process Diagram.

This process diagram describes in detail about the over-all process/steps involved in the monitoring of DHVPC transactions through CSB. The monitoring of DHVPC transactions can be done by the authorized officials in the Monitoring Cell/Department of the Reserve Bank of India or Central Bank of each Nation. These authorized officials can access the online portal using their official user ID and password, only for the purpose of monitoring. They are not authorized to do any other kind of activity in the online portal. If the user ID and password is incorrect, access will be declined.

After accessing the online portal, a monitoring window will be displayed before them. From the monitoring window, the officials have to select the "Transaction Mode", which includes (a). Transaction through CSB, (b). Transaction through ATM/CDM, (c). Transaction through online, (d). DHVPC wise and (e). Account holder wise. Here they have to select a. transaction through CSB. After that the monitoring officials can select the name of CSB from the list of CSB's, then the particular branch of CSB and then the duration to be monitored. After displaying the transactions in a particular duration, the monitoring official can select particular transaction for details, if he wants. If requires, a report can be generated at any point of monitoring process.

Drawing 26 of 29: Monitoring Process of Transactions Through ATM/CDM by Reserve Bank or Central Bank of Each Nation—Process Diagram.

In the case of monitoring of transactions through ATM/CDM, the monitoring officials can select the "Transactions through ATM/CDM" of monitoring window. Then select the 'State/Region' from the list, then District, then the name of the CSB of ATM/CDM, then select 'Display the list of ATM/CDM, from that list select the particular ATM/CDM and then enter the duration, then the result will be displayed. After displaying the transactions in a particular duration, the monitoring official can select particular transaction for details, if he wants. If requires, a report can be generated at any point of monitoring process.

In the case of monitoring of transactions through ATM/CDM, if the ID of a particular ATM/CDM is known, then directly enter then ID of the ATM/CDM, then enter the duration, then the result will be displayed. After displaying the transactions in a particular duration, the monitoring official can select particular transaction for details, if he wants. If requires, a report can be generated at any point of monitoring process.

Drawing 27 of 29: Monitoring Process of Transactions Through Net Banking by Reserve Bank or Central Bank of Each Nation—Process Diagram.

In the case of monitoring of transactions through Net banking, the monitoring officials can select the Transactions "through Net banking" of monitoring window. The monitoring officials then can select the name of the CSB through which Net banking has taken place and then the State/Region of CSB, then the district and then the duration to be monitored. After displaying the transactions in a particular duration, the monitoring official can select particular transaction for details, if he wants. If requires, a report can be generated at any point of monitoring process.

Drawing 28 of 29: Monitoring Process of DHVPC Wise Transactions by Reserve Bank or Central Bank of Each Nation—Process Diagram.

In the case of monitoring of transactions DHVPC wise, the monitoring officials can select the Transactions "DHVPC wise" of monitoring window. Then enter the details of the DHVPC, and then the details of all transactions of that particular DHVPC will be displayed. From those details, the monitoring officials can select particular transaction for details, if he wants. If requires, a report can be generated at any point of monitoring process.

Drawing 29 of 29: Monitoring Process of Account Holder Wise Transactions by Reserve Bank or Central Bank of Each Nation—Process Diagram.

In the case of monitoring of Transactions "Account holder wise", the monitoring officials can select the "Transactions Account holder wise" of monitoring window. Then enter the details of the Account holder (customer), like name and Account number. Then enter the duration, and then the result will be displayed. After displaying the transactions in a particular duration, the monitoring official can select particular transaction for details, if he wants. If requires, a report can be generated at any point of monitoring process.

Though the present embodiment of the invention describes the use of alpha numeric code, Bar Code, and QR Code on the paper currency, it is to be noted that the other such similar security identification codes may very well be used in other embodiments of the invention. All such security identification codes (such as alpha numeric code, Bar Code, QR Code and others) are collectively termed as identifiers. In embodiments where multiple security identification codes are used, one of the codes (which may be a primary security identification code) may be termed as a principal identifier. For representing the supreme banking and regulatory authority of a country, though the present embodiment of the invention uses terms such as 'Reserve Bank' or the 'Central bank', it is to be noted that, similar institutions specific to each country may be included in other embodiments of the present invention. Such similar supreme banking and regulatory authority (such as 'Reserve Bank', 'Central bank' or any other specific to a country) is termed as 'Central monetary agency'. For representing institutions which are affiliated (and governed by) to the Central monetary agency of a country, though the present embodiment of the invention uses term 'Registered Commercial and Scheduled Banks', it is to be noted that, similar institutions which are affiliated to (and governed by) the Central monetary agency of country are well covered within embodiments of the present invention. All such institutions which are affiliated to (and governed by) the Central monetary agency (such as 'Registered Commercial and Scheduled Banks' and others) may be collectively termed as 'Financial Institutions'. It is to be noted that the term update (or updating, or updated, or updation) have been used synonymously with synchronize (or synchronizing, or synchronized, or synchronization).

I claim:

1. A method for making and transacting a digitalized high value paper currency (DHVPC) having a combination of physical currency and digital currency with data on an online portal for the DHVPC, the method comprising:
    a) registering details of the printed physical currency comprising an identifier on the online portal of a central monetary agency for DHVPC by using a software module, where a central monetary agency is a reserve or central bank of a nation;
    b) linking details of one or more financial institutions with the online portal, the financial institutions having records of one or more account holders;
    c) distributing the physical currency to the one or more financial institutions;
    d) generating and registering new accounts for the DHVPC for each of the one or more account holders, the new accounts connected to the online portal, where registration of the one account holder includes linking the details of a DHVPC account to a main account of the same account holders for facilitating transactions;
    e) transacting the DHVPC from a first account corresponding to one user comprising at least the purchase/issue of the DHVPC, the purchase/issue of the DHVPC including debiting an amount of money from the main account and crediting the same amount of money to the DHVPC account, wherein transacting also includes transacting from a first account corresponding to a first user to a second account corresponding to a second user, wherein all the transactions include the physical transfer of the paper currency;
    f) recording and automatically synchronizing the details of the transaction with the linked online portal for facilitating tracking and monitoring.

2. The method as claimed in claim 1, the method further comprising opening a new online portal through the central monetary agency of a nation with a high security software before registering the DHVPC with the central monetary agency of a nation.

3. The method as claimed in claim 1, wherein the identifier includes a principal identifier, which comprises an alphanumeric code or DHVPC number.

4. The method as claimed in claim 1 the method further comprising registering the DHVPC with additional identifier, wherein the additional identifier is a bar code.

5. The method as claimed in claim 1 the method further comprising registering the DHVPC with an additional identifier, wherein the additional identifier is a QR code.

6. The method as claimed in claim 1, including registration of financial institutions with the online portal of the central monetary agency of a nation,
    wherein the central monetary agency of a nation issues a linking software module to one or more financial institutions which are eligible and qualified for DHVPC transactions, which are linked with the online portal of the central monetary agency;
    the one or more financial institutions have a website bearing a hyperlink to access the online portal for DHVPC transactions;
    the one or more financial institutions provides registration of the DHVPC for account holders; and
    creating a record of the DHVPC transactions.

7. The method as claimed in claim 1, wherein the central monetary agency and the financial institutions are enabled access to the online portal using a user identification and password for DHVPC registration, transaction and monitoring.

8. The method as claimed in claim 1, wherein the method comprises the step of registration of the DHVPC utilizing alphanumeric code, the registration being through the central monetary agency of a nation.

9. The method as claimed in claim 1, wherein the method comprises a step of making a first entry of a DHVPC record with the central monetary agency of the nation, wherein further data added to this record is automatically synchronized with the online portal of the central monetary agency of the nation for preventing counterfeiting, enabling tracking and monitoring by the central monetary agency and by the financial institutions.

10. The method as claimed in claim 1, wherein the method comprises registering the new accounts for DHVPC for each of one or more account holders,
    wherein registration of new accounts for the one or more account holders by the financial institutions includes linking the one or more DHVPCs of each account holder through a DHVPC account to the main account of the same account holder for facilitating transactions so that debiting from the main account and crediting to the DHVPC account and vice versa takes place in transactions;

during registration, a ledger window displaying information about the DHVPC transaction opens by linking to the ledger window displaying information about the main account; and another ledger window for the DHVPC is generated automatically in the online portal of the central monetary agency of a nation for the account holder.

11. The method as claimed in claim 1, wherein the method comprises the step of enabling DHVPC account holders and financial institutions to perform DHVPC transactions of purchase, surrender and transfer of DHVPC, wherein these transactions are automatically updated with the online portal of a central monetary agency of a nation.

12. The method as claimed in claim 1, the transaction comprising the purchasing of the DHVPC, wherein registered account holders are enabled to purchase the DHVPC from the ATMs having facility for the issue of DHVPC or through financial institutions, wherein a value of amount of money is debited from the main account and credited to the DHVPC account of the account holder with the issuance of physical currency of DHVPC.

13. The method as claimed in claim 1, the transaction comprising surrender of the DHVPC, wherein an account holder also is enabled to surrender the DHVPC to the one or more financial institutions or Cash Deposit Machine (CDM) having DHVPC accepting facilities, wherein the value of amount of money is debited from the DHVPC account and credited to the main account of the account holder with surrender of physical currency of DHVPC.

14. The method as claimed in claim 1, the transaction comprising the transaction of transfer of the DHVPC, wherein the account holders transfers the DHVPC to another account holder through the one or more financial institutions or through netbanking or through ATM using login id and password, wherein the value of amount of money of the transfer is debited from the DHVPC account of the first account holder and is credited to the DHVPC account of the second account holder with the transfer of the physical currency of the DHVPC.

15. The method as claimed in claim 1, wherein the method further comprises the transactions of surrender of DHVPC and transfer of DHVPC,
wherein these transactions require multiple authentications, wherein at least one of the multiple authentications comprises a DHVPC number or alphanumeric code.

16. The method as claimed in claim 1, wherein the method further comprises the transactions of purchase of DHVPC, surrender of DHVPC and transfer of DHVPC,
wherein these transactions require multiple authentications, wherein at least one of the multiple authentications comprises a one-time password, which is only valid for a single transaction.

17. The method as claimed in claim 1, wherein the method further comprises the transactions of purchase of DHVPC, surrender of DHVPC and transfer of DHVPC,
wherein these transactions require multiple authentications, wherein at least one of the multiple authentications comprises of account details.

18. The method as claimed in claim 1, the method further comprising issuing a replacement DHVPC physical currency with a new DHVPC number when a physical currency of DHVPC is lost, stolen or damaged, wherein authenticating the replacement currency includes a DHVPC number or an alphanumeric code.

19. The method as claimed in claim 1, the method further comprising issuing a replacement DHVPC physical currency with a new DHVPC number when a physical currency of DHVPC is lost, stolen or damaged, wherein authenticating the replacement currency includes an OTP which is only valid for a single transaction.

20. The method as claimed in claim 1, the method further comprising issuing a replacement DHVPC physical currency with a new DHVPC number when a physical currency of DHVPC is lost or stolen or damaged, wherein authenticating the replacement currency includes account details of the corresponding account the replacement DHVPC is issued to.

21. The method as described in claim 1, wherein an amount of physical currency of DHVPC is lost, stolen or damaged, the method further comprising crediting an amount of money corresponding to the amount of physical currency of DHVPC which is lost, stolen or damaged to the main account by debiting the same amount from the DHVPC account.

22. The method as claimed in claim 1, the method further comprising issuing a new DHVPC physical currency with a new DHVPC number for the lost, stolen or damaged physical currency of DHVPC, wherein after crediting the amount of money equivalent to the amount of money for the lost, stolen or damaged DHVPC to the main account by debiting this amount of money from the DHVPC account, an amount of money required for issuing a new DHVPC physical currency is debited from the main account and the same amount is credited to the DHVPC account, and a new DHVPC is issued with a new DHVPC number or alphanumeric code.

23. The method as claimed in claim 1, the method further comprising disabling a third party from using the DHVPC currency by preventing the third party from executing the multiple authentications of the DHVPC, including authenticating a DHVPC number or alphanumeric code.

24. The method as claimed in claim 1, the method further comprising disabling a third party from using the DHVPC currency by preventing the third party from executing the multiple authentications of the DHVPC, including authenticating an OTP number which is only valid for a single transaction.

25. The method as claimed in claim 1, the method further comprising disabling a third party from using the DHVPC currency by preventing the third party from executing the multiple authentications of the DHVPC, including authenticating a DHVPC using account details.

26. The method as claimed in claim 1, the method further comprising reissuing currency in the event where an amount of physical currency of DHVPC being used by a third party is lost, stolen or damaged, including:
providing a monetary reward for producing the lost, stolen or damaged physical currency of DHVPC;
disabling a third party from using the DHVPC currency by preventing the third party from executing the multiple authentications of the DHVPC;
enabling access to the online portal to verify the physical currency of DHVPC, including authenticating the DHVPC to determine authenticity, and an interface for recording the details of the third party who is producing the DHVPC when the DHVPC is determined to be authentic; and determining an appropriate financial institution corresponding to the original owner of the DHVPC, and moving the physical produced DHVPC currency to this financial institution.

27. The method as claimed in claim 1, wherein the central monetary agency of a nation and financial institutions are enabled to monitor DHVPC transactions by recording the method of transaction, the methods including ATM, net banking, and financial institution.

28. The method as claimed in claim 1, the method comprising the step of monitoring transactions of DHVPC done through an ATM or through the netbanking, wherein:
   a. the central monetary agency of a nation or financial institutions are given access to the online portal by providing an appropriate user ID and password;
   b. selecting and displaying the appropriate state/region, district, name of the financial institution associated with the ATM, and the specific ATM from a list of ATMs in the area;
   c. selecting particular transaction details; and
   d. generating a report of the steps of transaction monitoring.

29. The method as claimed in claim 1, the method comprising the step of monitoring transactions of DHVPC, wherein:
   a. the central monetary agency of a nation or financial institutions are given access to the online portal by providing an appropriate user ID and password;
   b. details of the DHVPC, and then the details of all transactions of that particular DHVPC are displayed;
   c. selecting particular transaction details; and
   d. generating a report of the steps of transaction monitoring.

30. The method as claimed in claim 1, the method comprising the step of monitoring transactions of DHVPC, wherein:
   a. the central monetary agency of a nation or financial institutions are given access to the online portal by providing an appropriate user ID and password;
   b. selecting an account holder and entering their corresponding account details;
   c. selecting a specific transaction of an account holder; and
   d. generating and displaying a report of the specific transaction of the account holder, wherein the report includes information about every step of the transaction monitoring.

* * * * *